(12) United States Patent
Kobayashi et al.

(10) Patent No.: US 7,522,498 B2
(45) Date of Patent: Apr. 21, 2009

(54) OPTICAL INFORMATION RECORDING APPARATUS

(75) Inventors: Seiji Kobayashi, Tokyo (JP); Tsutomu Ishimoto, Tokyo (JP); Hisayuki Yamatsu, Tokyo (JP); Roderick Koehle, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 11/685,657

(22) Filed: Mar. 13, 2007

(65) Prior Publication Data

US 2007/0153666 A1 Jul. 5, 2007

Related U.S. Application Data

(60) Division of application No. 10/810,654, filed on Mar. 29, 2004, now Pat. No. 7,319,656, which is a continuation of application No. 09/555,658, filed as application No. PCT/JP99/02294 on Apr. 28, 1999, now Pat. No. 6,754,158.

(30) Foreign Application Priority Data

Oct. 2, 1998 (JP) .................................. 10-281422

(51) Int. Cl.
G11B 15/52 (2006.01)
(52) U.S. Cl. .................................. 369/47.51; 369/53.26
(58) Field of Classification Search .................... None
See application file for complete search history.

(56) References Cited

U.S. PATENT DOCUMENTS 6,088,323 A * 7/2000 Kobayashi et al. ....... 369/275.3

FOREIGN PATENT DOCUMENTS

| JP | 06-036514 | 2/1994 |
|---|---|---|
| JP | 7-272325 | 10/1995 |
| JP | 07-320274 | 12/1995 |
| JP | 8-77618 | 3/1996 |
| JP | 09-138691 | 5/1997 |
| JP | 9-306144 | 11/1997 |
| JP | 9-312021 | 12/1997 |
| JP | 10-31825 | 2/1998 |

* cited by examiner

*Primary Examiner*—Paul Huber
(74) *Attorney, Agent, or Firm*—Oblon, Spivak, McClelland, Maier & Neustadt, P.C.

(57) ABSTRACT

The present invention is applicable to a recording apparatus of a CD or DVD, a recording method thereof and a recording medium, and an object of the present invention is to clearly record a second information such as characters and figures between two recording levels in an optical disk. The second information is recorded in a predetermined area in a radius direction and a angular direction on the optical information recording medium, and further, the second information is recorded according to a change of a pit width based on a change of power of the laser beam, a change of a pit length based on an on/off control of the laser beam, or a change of depression or bulge of the pit based on a change in the vicinity of the on/off control of the laser beam. Whereby it is possible to record the second information such as a watermark pattern or a visible image, which is capable of being confirmed by seeing a disk.

3 Claims, 29 Drawing Sheets

POSITIONAL INFORMATION ON
POLAR COORDIATE SYSTEM

POSITIONAL INFORMATION ON
RECTANGULAR COORDINATE SYSTEM

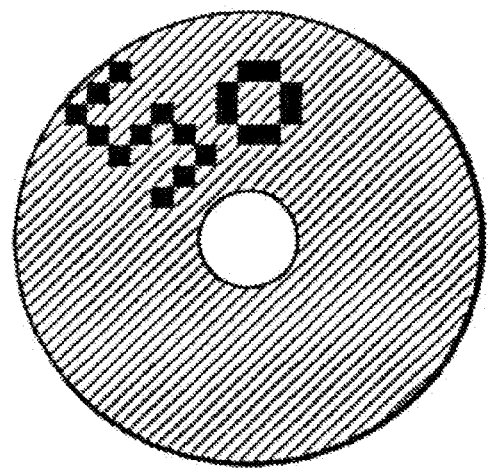
PATTERN TO BE DRAWN ON DISK
F I G. 5A
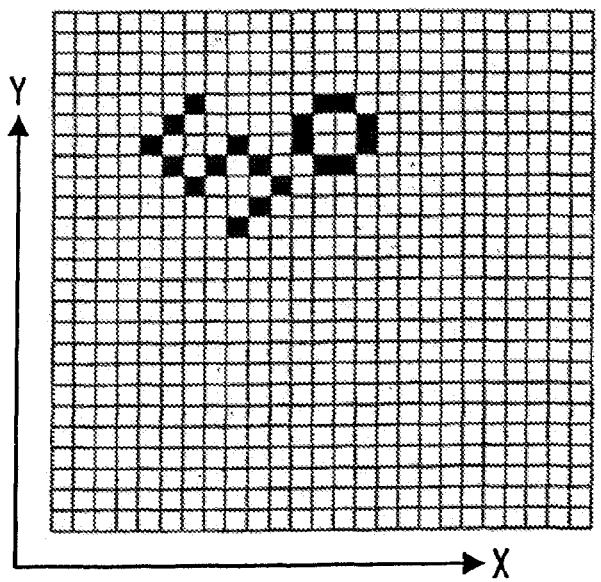
PATTERN RECORDED IN INTERNAL MEMORY
OF CHARACTER SIGNAL GENERATING CIRCUIT
F I G. 5B F I G. 17
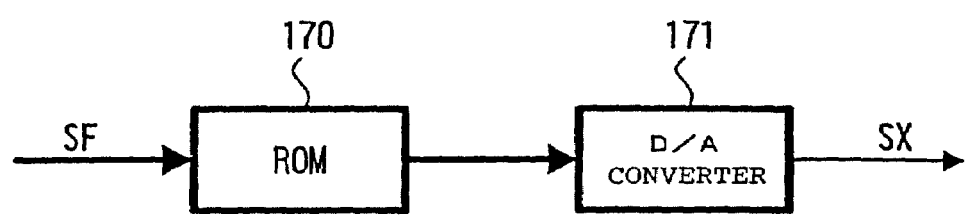

  
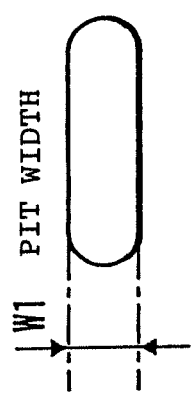 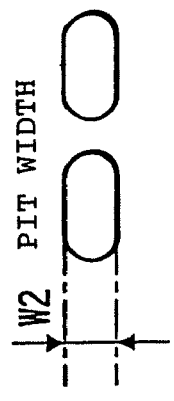 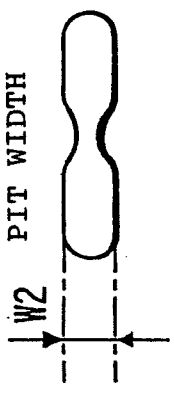
F I G. 23A  USUAL RECORDING PIT
F I G. 23B  TWO-DIVIDED RECORDING PIT
F I G. 23C  REPRESSED RECORDING PIT

OPTICAL INFORMATION RECORDING APPARATUS

CROSS REFERENCE TO RELATED APPLICATIONS

This application is a divisional of U.S. application Ser. No. 10/810,654 filed on Mar. 29, 2004, which is a continuation of U.S. application Ser. No. 09/555,658 filed on Oct. 31, 2000, which is a National Stage of PCT/JP99/02294 filed on Apr. 28, 1999, all of which claim priority to Japanese Patent Application No. 10-281422 filed on Oct. 2,1998. The contents of each of these documents are incorporated herein by reference.

TECHNICAL FIELD

The present invention relates to an optical information recording apparatus and method, and an optical information recording medium. For example, the present invention is applicable to a recording apparatus for a compact disk (CD) and a digital video disk (DVD), and to its recording method. According to the present invention, a positional information of laser beam irradiation position on a polar coordinate is converted into a positional information on a rectangular coordinate so as to access the corresponding image data, and then, in accordance with the image data, a laser beam power is controlled. Whereby it is possible to readily and visibly record characters and images in an information recording surface of a CD or the like.

Moreover, according to the method determined based on the CD and DVD standards, a recording laser is turned on and off, and thereby, information such as music and a video signal is recorded on an optical disk. Simultaneously, the recording laser output (power) is gently varied, and thereby, it is possible to record a second information which is not determined in the CD and DVD standards, in the identical optical disk.

In the present invention, according to the method determined based on the CD and DVD standards, a recording laser is turned on and off, and thereby, information such as music and a video signal is recorded on an optical disk. Simultaneously, a luminous pulse of the recording laser is divided into two parts, or is made so as to have a depressed portion, and thereby, it is possible to record a second information which is not determined in the CD and DVD standards, in the identical optical disk.

Further, the optical information recording medium of the present invention can record a new information such as a watermark capable of being visibly confirmed by seeing a disk, a visible image or the like, in addition to the above information such as music and a video signal determined based on the CD and DVD standards.

BACKGROUND ART

Conventionally, in this type of optical information recording medium, for example, a compact disk, a data used for recording is subjected to data processing, and thereafter, is modulated according to an EFM (Eight to Fourteen Modulation)(hereinafter, referred simply to as "EFM-modulated"). In this manner, a pit line is formed in the compact disk, and has a period 3T to 11T with respect to a predetermined basic period T, and thereby, an audio data or the like is recorded.

On the contrary, in a compact disk player, a laser beam is irradiated to a compact disk, and then, a return light is received, and thereby, it is possible to obtain a regenerative signal of the return light, which has a signal level which varies in accordance with a light quantity. Then, the regenerative signal is binarized according to a predetermined slice level so that a binary signal is generated. Further, according to the binary signal, a PLL circuit is driven so as to generate a reproducing clock, and the binary signal is successively latched by the reproducing clock, and thereby, it is possible to generate a reproductive data having a period 3T to 11T corresponding to a pit line formed in the compact disk.

The compact disk player decodes the reproductive data thus generated according to the data processing corresponding to data processing in recording, and then, a pit line is formed on a compact disk substrate. Further, a reflection film is formed on the disk substrate, and thus, an information recording surface is formed thereon. Moreover, characters such as a title, a name of music and a maker name, and images are visibly printed on the information recording surface according to screen process printing.

DISCLOSURE OF THE INVENTION

For example, according to Japanese Patent Application No. 8-205292 as filed on Jul. 16, 1996 by the applicant, the following optical disk apparatus has been disclosed therein. More specifically, in accordance with all signal pattern to be recorded, a displacement shifted from an ideal edge position of the regenerative signal is determined, and then, a table is prepared. Further, with the use of the table, an edge position of a recording signal is varied and recorded in accordance with a recording signal pattern, and thereby, a jitter can be removed. Thus, it is possible to overlap and record characters and figures, that is, a second information which is not included in the CD standards, in a signal recording area of the compact disk (CD). Further, according to Japanese Patent Application No. 9-67843 as filed on Mar. 5, 1997 by the applicant, the following optical disk apparatus has been disclosed therein. More specifically, an ID pattern such as a bar code by a watermark is recorded in a read-in or signal recording area of an optical disk, and then, the pattern is electrically detected. By doing so, a disk ID or cipher is read out so as to prevent a copy or pirated edition of the optical disk from appearing on the market. Further, according to Japanese Patent Application No. 9-298328 as filed on Oct. 30, 1997 by the applicant, the following optical disk apparatus has been disclosed therein. More specifically, in order to show a cutting position, the optical disk apparatus includes a circuit which converts a polar coordinate of a radius (track number) and a rotational speed (number of FG pulse) into a rectangular coordinate at a real time, and thereby, a data expressed by the rectangular coordinate system is used as it is, and then, it is possible to carry out cutting. Of course, these optical disk apparatuses record an EFM-modulated signal which is determined in the compact disk standards, in addition to information such as characters, figures or the like. Therefore, it is possible to reproduce an optical compact disk by the conventional player, and in addition, characters and figures are recorded in the signal area of the disk, so that a disk having a high value added can be manufactured.

Moreover, Japanese Patent application No. 9-347532 filed by the present applicant have disclosed an optical information recording apparatus, an optical information recording method and an optical information recording medium, which can record second information such as characters and figures recorded on a disk as a difference of laser output power, and as a result, can record a clear second information. In addition, Japanese Patent application No. 9-173811 filed by the present applicant have disclosed an optical disk recording apparatus, an optical disk and an optical disk reproducing apparatus (player), which divides a pit having a period 9T or more into 4T +1T +4T so that a space is recorded as the center 1T in place of a pit, and thereby, can record a new information depending upon the pit whether or not it is divided into two.

According to the invention disclosed in the aforesaid Patent Applications, there is the possibility that a signal characteristic is variable in boundary portion where a laser output varies; for this reason, a change of the laser output is not too widely taken. As a result, there is a problem that the recorded second information such as characters and figures are not clear. Moreover, in production and sale of the optical disk such as CD and DVD, a illegal copy and an expansive sale of disk are an important matter. One method for preventing the illegal copy is to record a watermark (pattern) on the disk similarly to that carried out in bills (paper money). The recorded watermark is a visible or dim image, or an invisible signature which is visibly stood out on an information layer of the disk detected by a special hardware. The disk having the watermark is not transferred even in the case of being copied by a conventional technique; therefore, it is possible to simply confirm a truth of the disk.

Unexamined Patent Publication (Kokai) No. 10-31825 has disclosed a method of recording a watermark (pattern) on an optical disk by varying a size of an information pit. In two areas on the disk having an information pit of different size, a contrast of reflection light is visible to a user (observer). In order to manufacture the disk as described above, a laser beam intensity (power) in a mastering process is modulated in accordance with a pattern to be recorded.

When reading out the disk, a regenerative signal generated as the result is affected by a size of the modulated pit. In order to reproduce the disk with the use of the conventional reproducer (player), a pit edge position is corrected so as to shape the regenerative signal for correctly reproducing the disk by the reproducer. Further, in order to securely and safely reproduce the disk, a change from a certain power level to other power level is carried out by slowly varying an optical modulation input voltage of a mastering machine, in place of suddenly changing a voltage.

In order to achieve a desired smooth change, the modulation voltage changing function must be carefully selected on the basis of the following three problems.

First, an optical modulator for modulating a light intensity has a non-linear characteristic to be considered. secondary, a optical intensity level of the optical modulator and a shift of an information pit edge are interacted, and must be properly selected. Thirdly, the characteristic of the optical modulator depends upon an alignment of a mastering machine, and is variable according thereto.

The following is a description on the most simple method for solving the above problems. In the case of transferring the light intensity from a certain light intensity to other light intensity, a voltage of the optical modulator is gradually variable at an equal voltage step. Simultaneously, in each modulation voltage, a pit edge position is gradually moved bit by bit according to an linearly interpolated value. According to this method, the optical modulator is operated well unless it has non-linear characteristic. However, when a cutting operation is carried out by using a simple interpolation, in the case of using an optical modulator having a non-linear characteristic, in a regenerative signal RF of the manufactured optical disk, an overshoot is generated in envelop; as a result, a jitter is worsen.

The proper method for recording the conventional watermark pattern is realized by collectively changing a light intensity level of a recording laser during disk mastering. However, according to this conventional method, if the recording power is collectively changed during mastering, an non-alignment portion is generated in the vicinity of a change point in a waveform of the regenerative signal, and there is a problem that depending upon a player, an error rate is worsen in the vicinity of the change point.

Further, the above Unexamined Patent Publication (Kokai) No. 10-31825 has disclosed a method of correcting a waveform (figure) of the regenerative signal by replacing a pit edge depending upon a recording power level. This shows that according to a change of signal characteristic, in a change of the watermark patter allowable in the player, a laser power is slowly changed. However, there is a problem that the non-linearity of the optical modulator must be specially considered.

Unexamined Patent Publication (Kokai) No. 7-201079 has disclosed a technique of forming a reflection layer on a surface of a card main body using a phase-change area such as a phase-change layer as a visibly or invisibly information such as characters, pictures and patterns. However, the above Unexamined Patent Publication (Kokai) No. 7-201079 has no any consideration relative to the aforesaid problems.

It is, therefore, an object of the present invention to provide an optical information recording medium, an optical information recording apparatus and an optical information recording method, which can clearly record a second information such as recorded characters and figures in an information recording surface of a compact disk.

In order to solve the above problems, according to the present invention, in the optical information recording apparatus and method, a positional information by a polar coordinate based on a rotation of the optical information recording medium is converted into a positional information by a rectangular coordinate, and then, the positional information by the rectangular coordinate is addressed so as to output an image data, and thus, in accordance with the image data, a laser beam power is varied.

The laser beam power is varied in accordance with the positional information by the polar coordinate so as to vary a pit width, and thereby, it is possible to change a reflection factor of the information recording surface in synchronous with a rotation of the optical information recording medium, and thus, to visibly record characters and images. At this time, the positional information by the polar coordinate is converted into the positional information by the rectangular coordinate so as to access the image data, and thereby, the rectangular coordinate used in various information apparatuses is addressed, and for example, a binary image data is used as it is, and thus, characters and figures can be recorded. Therefore, it is possible to readily record a visible character and image.

Further, according to the present invention, it is possible to record a second information such as characters and figures recorded on a disk with the use of a difference of laser output power; as a result, a clear second information can be recorded. In addition, in the optical information recording medium of the present invention, it is possible to make large a change of the pit width by the second information, so that the second information can be more clearly confirmed.

Further, according to the present invention, a modulation signal, which is variable in accordance with the first information, is generated, and a time changing signal, which is variable according to the second information with a time, is generated. Then, a laser power is varied according to the time changing signal, and a laser beam obtained from the change of output power is on/off-controlled according to the modulation signal, and thereby, a change of the laser power by the second information is gently carried out. Moreover, the first information is recorded by mainly varying a pit length and position; on the other hand, the second information is recorded by mainly varying a pit width. Whereby a change of the pit width by the second information is stepwise carried out.

Further, according to the present invention, in accordance with the first information, a signal level is changed over at a period of integer multiples of a predetermined basic period, and thereby, a first modulation signal is generated, and then, a relative positional information on a disk-like recording medium is detected by means of a pickup. In accordance with the relative positional information, the second information is generated, and then, according to the second information, a part of the modulation signal is modified, and thus, the laser beam is modulated according to an output of the second modulation means.

The first information is recorded by mainly changing the pit length and position, and the second information is recorded in a manner that of the pits, a pit having a predetermined length or more is divided into two parts or if formed so as to have a depression or bulge, and thus, the second information forms a two-dimensional pattern on the optical information recording medium.

Further, according to the present invention, when slicing into a binary in reproducing, a time of the recording signal is previously corrected so that no jitter is generated.

Further, according to the present invention, a transition area of a pit change based on the second information ranges from 0.1 mm to 1 mm; therefore, a pattern is not dim, and the second information can be clearly confirmed.

Further, according to the present invention, a laser intensity of the modulated laser beam is measured, and a driving signal of the modulated laser beam is controlled, and further, an intensity characteristic of the laser beam is measured with respect to a predetermined pair of amplitudes of the driving signal. In this manner, an invert operation of the above characteristic is carried out so as to store an invert operation value which is a driving signal corresponding to a certain power intensity.

Then, a timing correction value relative to an intermediate power intensity level is determined in a displacement period for linearly interpolating a timing value at a predetermined power intensity level, and thereby, in an invert operation for storing the invert operation characteristic for outputting a desired power intensity, the laser power intensity is directly controlled during a change period for investigating a necessary driving amplitude. As a result, the regenerative signal of the optical information recording medium has a smooth change in a range where a recording power intensity varies, and thereby, the optical information recording medium can be stably reproduced.

BRIEF DESCRIPTION OF DRAWINGS

FIG. 4 is a view showing a state of coordinate transformation in the coordinate transforming circuit of this first embodiment.

FIG. 5 is a view to explain an operation of a character signal generating circuit of this first embodiment: FIG. 5A is a view showing a pattern to be drawn on a disk, and FIG. 5B is a view showing a pattern recorded in an internal memory of the character signal generating circuit.

FIG. 15A shows a second information SE, FIG. 15B shows an up signal UP and a down signal DN, FIG. 15C shows a count value SF, FIG. 15D shows an analog voltage signal SX, and FIG. 15E shows a reference clock FK.

FIG. 17 is a block diagram showing a construction of a voltage converter circuit of this second embodiment.

FIG. 21A shows an output signal SD, FIG. 21B shows a recording pit, FIG. 21C and 21F show regenerative signals, FIG. 21D shows a two division output signal SD, and FIG. 21E shows a regenerative signal.

FIG. 23 is a view schematically showing state of pit recorded on the optical disk of this third embodiment: FIG. 23A shows an ordinary recording pit, FIG. 23B shows a two-division recording pit, and FIG. 23C shows a depressed recording pit.

FIG. 27 is a view showing an output signal with respect to a change from a certain power level to other power level:

FIG. 30 is a view showing a regenerative signal in this fourth embodiment.

BEST MODE FOR CARRYING OUT THE INVENTION

Description of First embodiment

Figure 1:
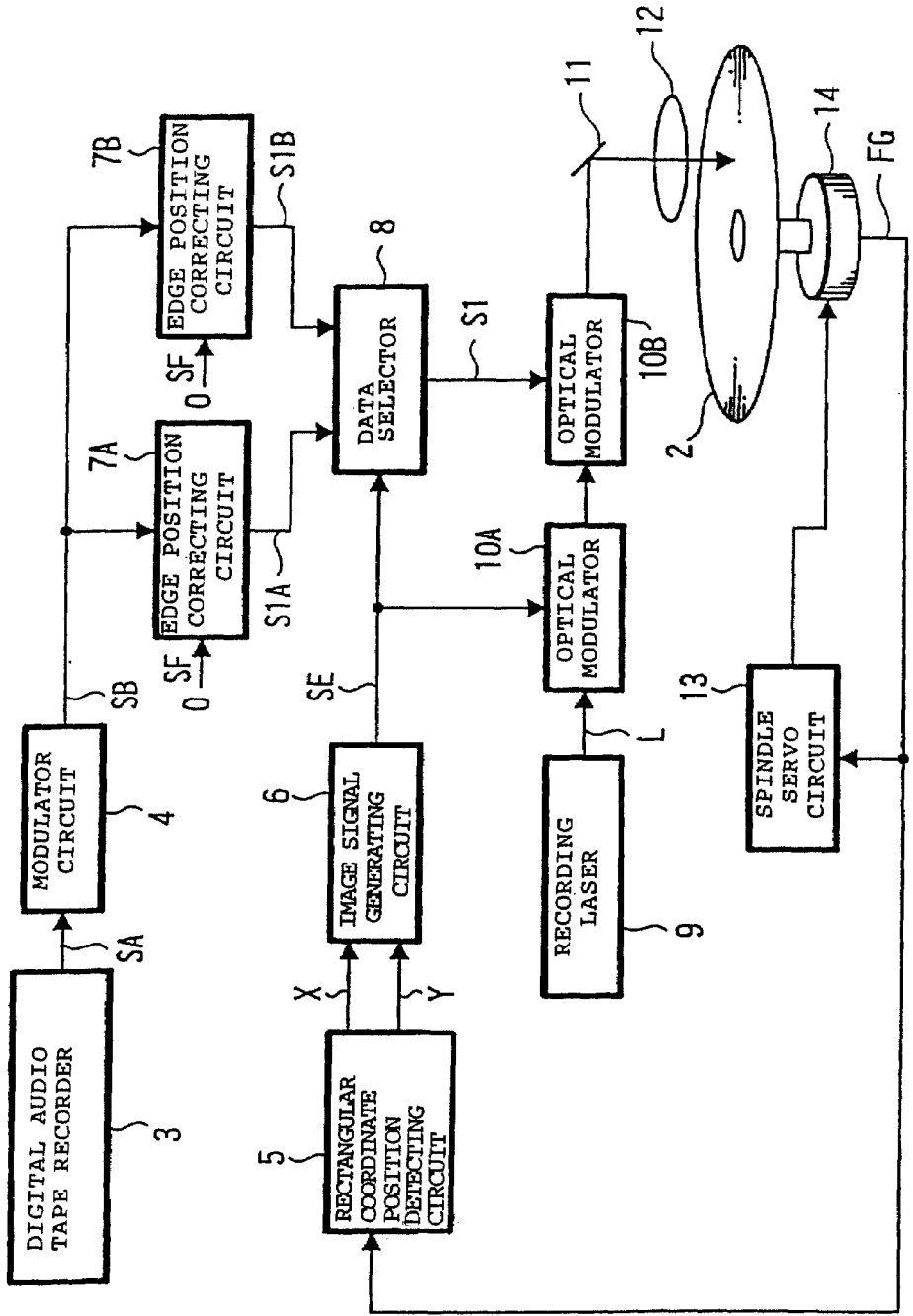
FIG. 1 is a block diagram showing a construction of an optical disk apparatus according to a first embodiment of the present invention.

FIG. 1 is a block diagram showing an optical disk apparatus according to a first embodiment. The optical disk apparatus 1 exposes a disk master 2 so as to record an audio data SA outputted from a digital audio tape recorder 3 therein. At this time, a power of laser beam L used for exposure is varied according to a predetermined image data, and thus, a predetermined image and character are visibly recorded on an information recording surface of a compact disk. In a manufacturing process of an optical disk, the disk master 2 is developed, and thereafter, is subjected to electro-forming, and thereby, a master disk is prepared, and then, a stamper is manufactured with the use of a mother disk. Further, in the manufacturing process of an optical disk, a disk substrate is prepared by the stamper thus prepared, and then, a reflection film and a protection film are formed on the disk substrate, and thus, a compact disk is manufactured.

More specifically, in the optical disk apparatus 1, a spindle motor 14 rotatably drives the disk master 2, and an FG signal generating circuit held on the bottom of the spindle motor 14 outputs an FG signal FG, in which a signal level rises every when the disk master motor is rotated by a predetermined angle, to a spindle servo circuit 13 and a rectangular coordinate position detecting circuit 5. In this first embodiment, the FG signal FG outputs 4200 pulses every when the disk master 2 makes one rotation. The spindle servo circuit 13 drives the spindle motor 14 so that a frequency of the FG signal FG becomes a predetermined frequency, and thereby, the disk master 2 is rotatably driven under the condition of a constant linear velocity.

A recording laser 9 comprises a gas laser or the like, and emits a laser beam L for exposing the disk master. An optical modulator 10A comprises an electrically acoustic optical element, and varies a power of laser beam L in accordance with a second information SE so as to output the laser beam L.

An optical modulator 10B comprises an electrically acoustic optical element, and makes an on-off control of the laser beam L according to a modulation signal S1 so as to emit the laser beam L. A mirror 11 bents an optical path of the laser beam L so that the laser beam is emitted toward the disk master 2, and then, an objective lens 12 converges a reflection light by the mirror 11 onto the disk master 2. These mirror 11 and objective lens 12 are successively moved to an outer circumferential direction of the disk master 2 by means of a thread mechanism (not shown) in synchronous with a rotation of the disk master 2, and thereby, an irradiation position by laser beam L is successively displaced toward the outer circumferential direction of the disk master 2.

In the optical disk apparatus 1, a track is formed into a spiral shaped on the disk master 2 by moving the mirror and the objective lens 12 in a state of rotating the disk master 2, and then, a pit is successively formed on the track in accordance with a modulation signal S1. Further, at this moment, a pit width is varied in accordance with a second information SE, and thereby, predetermined character and image are visibly recorded.

Figure 2:
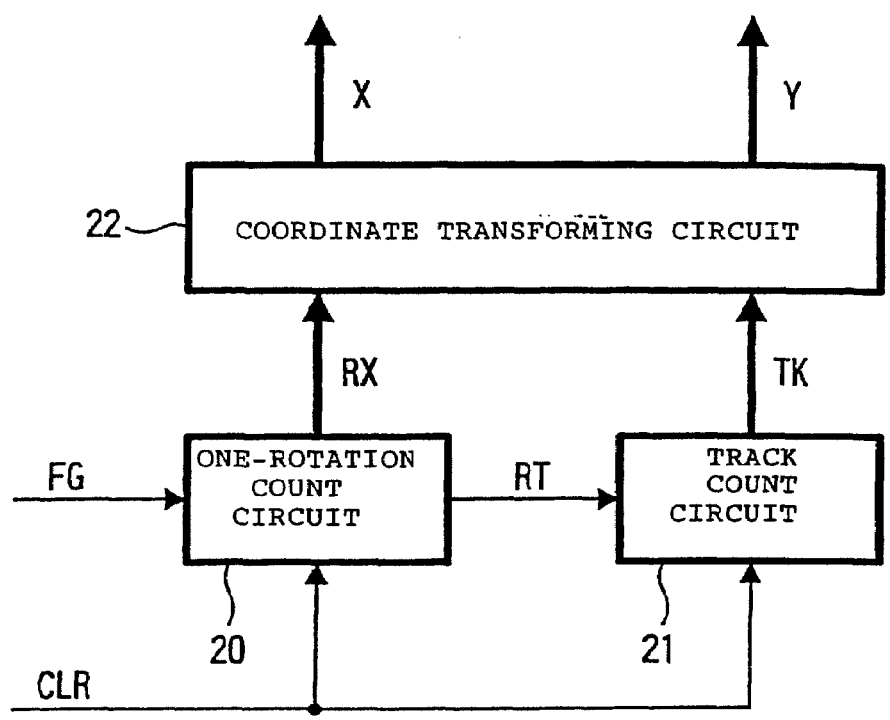
FIG. 2 is a block diagram showing a rectangular coordinate position detecting circuit of this first embodiment.

FIG. 2 shows a construction of a rectangular coordinate position detecting circuit 5 used in the case of generating the second information recorded in the above manner. In FIG. 2, a one-rotation count circuit 20 and a track count circuit 21 are cleared by a clear pulse CLR from a system controller (not shown) at a start of recording, and then, the initial value becomes zero. The FG signal from the spindle motor 14 outputs 4200 pulses every when the spindle motor 14 makes one rotation. When the one-rotation count circuit 20 counts 4200, the pulse is outputted as a count value RX. The count value RX takes values from 0 to 4199, and is incremented by one count every when the spindle motor 14 is rotated by 1/4200, and therefore, the count value expresses a rotational angle of the spindle motor 14. Further, when the spindle motor 14 makes one rotation, the counter is reset. Then, a pulse is generated as a signal RT every when the reset occurs, and the pulse thus generated is inputted to the track counter circuit 21.

The track count circuit 21 counts the signal RT of one pulse per one rotation of the spindle motor, and thereby, outputs a track number TK recording at present. For example, in the case of recording a compact disk (CD), recording is started at a position of the radius 23 mm of the compact disk, and is carried out by the radius 58 mm thereof with a track pitch of 1.6 micron. Thus, the value of the track count circuit 21 changes 0 to about 22000 counts.

As described above, the count value RX of the one-rotation count circuit 20 and the count value TK of the track count circuit 21 are equivalent to an angular information and a radius information in the case of expressing a position recording at present by a polar coordinate. Therefore, with the use of these two values, a coordinate transforming circuit 22 calculates a positional information X and Y on a rectangular coordinate system, and then, can output the positional information. The positional information X and Y on the rectangular coordinate system is converted in the above manner, and thereafter, is transmitted to an image (character) signal generating circuit 6.

Figure 3:
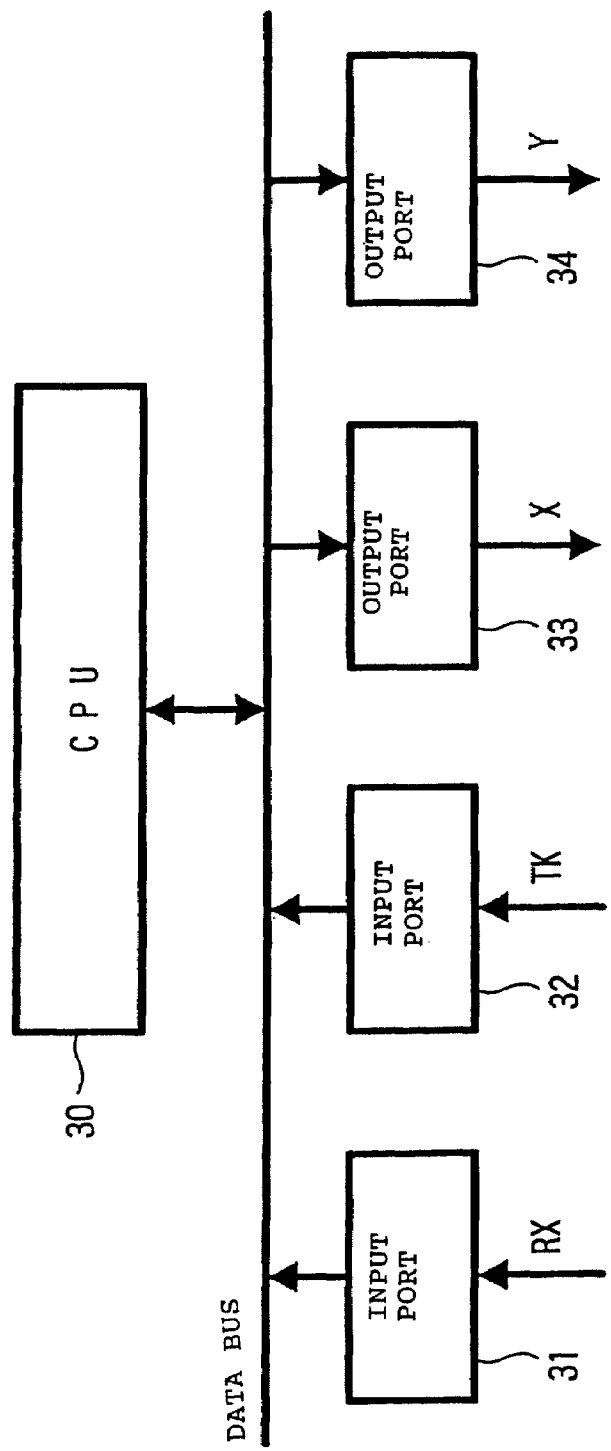
FIG. 3 is a block diagram showing a construction of a coordinate transforming circuit of this first embodiment.

The coordinate transforming circuit 22 has a construction as shown in FIG. 3. As shown in FIG. 3, a CPU is connected with input ports 31 and 32 while being connected with output ports 33 and 34. The count values RX and TK of the one-rotation count circuit 20 and the track count circuit 21 are respectively connected to the input ports 31 and 32 so that the CPU 30 can capture these count values.

The CPU 30 computes (calculates) positional information X and Y on a rectangular coordinate system from these two count values according to the following mathematical equations 1 and 2, and then, outputs them to output ports 33 and 34.

Mathematical equation 1:

$$X = A \cdot (TK \cdot Tp + Tb) \cdot \cos(2\pi \cdot (RX/4200)) + B$$

Mathematical equation 2:

$$Y = A \cdot (TK \cdot Tp + Tb) \cdot \sin(2\pi \cdot (RX/4200)) + B$$

Figure 4A:
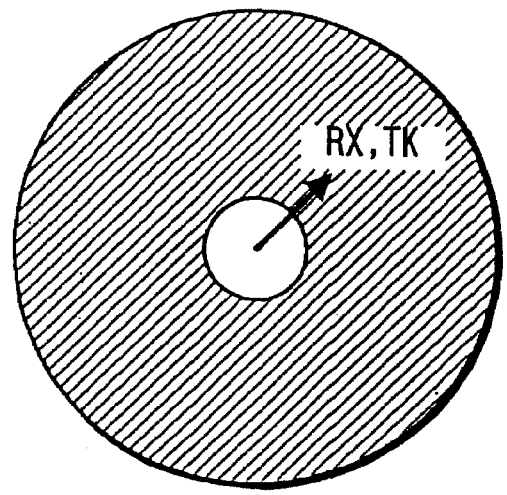
FIG. 4A is a view showing a positional information of a polar coordinate system.
Figure 4B:
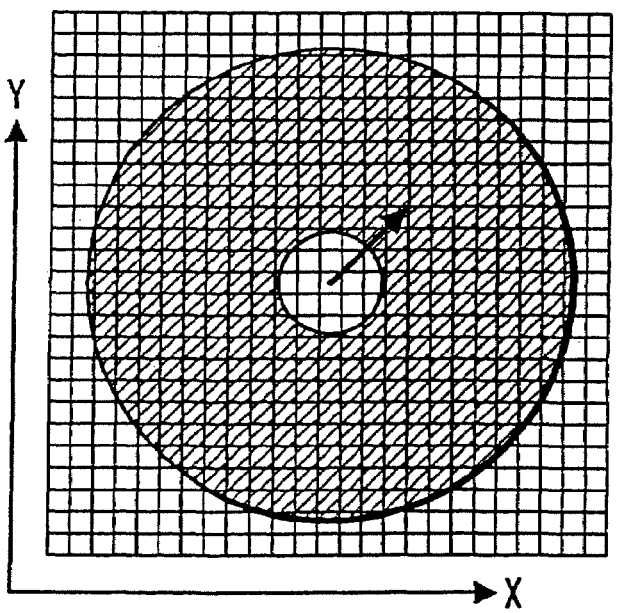
FIG. 4B is a view showing a positional information of a rectangular coordinate system.

In the mathematical equations 1 and 2, each of A and B is a constant determined by a dimension and position of coordinate system, Tb is indicative of a recording start radius, and Tp is indicative of a track pitch. The transformation as described above is performed; as a result, a positional information expressed by a polar coordinate system (RX, TK) as shown in FIG. 4A is transformed into a rectangular coordinate system (X, Y) as shown in FIG. 4B.

The image (character) signal generating circuit 6 is composed of an image memory storing an image data, a ROM (Read Only Memory) storing a character data, etc. Further, the image (character) signal generating circuit 6 inputs an address of the output (X, Y) from the rectangular coordinate position detecting circuit 5, and then, outputs a memory output as a second information SE representing characters and figures. For example, in the case of drawing a pattern as shown in FIG. 5A on a disk, a pattern as shown in FIG. 5B is recorded in an internal memory of the image (character) signal generating circuit 6. Namely, this image data comprises a bit-map font binary data which constitutes characters and figures to be recorded on a compact disk, and uses X and Y coordinates as address. The image data is prepared with the use of a computer, and is loaded in an image memory, and further, is set in the image memory by an image reader using a scanner or the like.

Thus, in the optical disk apparatus 1, a power of laser beam L is changed from a 100% laser power to a 85% laser power in accordance with the second information SE, and then, a pit width is locally varied in accordance with the image data. In the compact disk, a reflection factor (index) varies at a portion of a narrow-width pit and at a portion of an ordinary pit width; therefore, characters and images by the image data are visible.

As described above, in the case of varying the pit width and recording a digital audio signal SA, a modulator circuit 4 receives an audio data SA outputted from the digital audio tape recorder 3, and then, adds the corresponding sub-code data to the audio data SA. Further, the modulator circuit 4 processes the audio data SA and the sub-code data according to a compact disk format, and then, generates a modulation signal SB. More specifically, the modulator circuit 4 adds an error correcting code to the audio data SA and the sub-code data, and thereafter, subjects these data to interleaving and EFM modulation processing. Therefore, the modulator circuit 4 outputs an EFM modulation signal SB having a signal level which varies at a period (period 3T to 11T) of integer multiples of a basic period T, to the basic period of pit format.

Edge position correcting circuits 7A and 7B detect a change pattern of the EFM modulation signal SB, and then, correct the timing of the EFM modulation signal SB so as to reduce an interference between codes in accordance with the change pattern, and thus, output modulation signals S1A and S1B of the timing corrected result. At this time, the edge position correcting circuit 7A outputs an optical modulation signal S1A corresponding to a 100% laser beam L outputted from an optical modulator 10A; on the other hand, the edge position correcting circuit 7B outputs an optical modulation signal S1B corresponding to a 85% laser beam L outputted from an optical modulator 10A.

Figure 8:
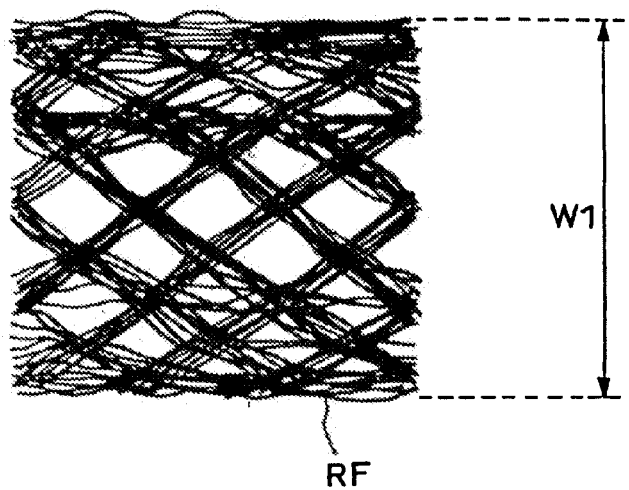
FIG. 8 is a signal waveform view showing a regenerative signal from a pit by a 100% laser beam power of this first embodiment.
Figure 9:
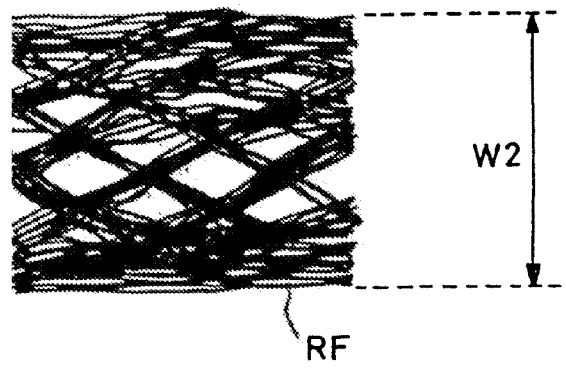
FIG. 9 is a signal waveform view showing a regenerative signal from a pit by a 85% laser beam power of this first embodiment.

In the manner as described above, a power of the laser beam L is changed from 100% to 85% so as to vary a pit width, and thereby, a signal level of the regenerative signal varies. More specifically, in the cases of 100% laser beam and 85% laser beam, as seen from an eye pattern of the regenerative signal RF shown in FIG. 8 and FIG. 9, amplitudes W1 and W2 of the regenerative signal RF.

Figure 10:
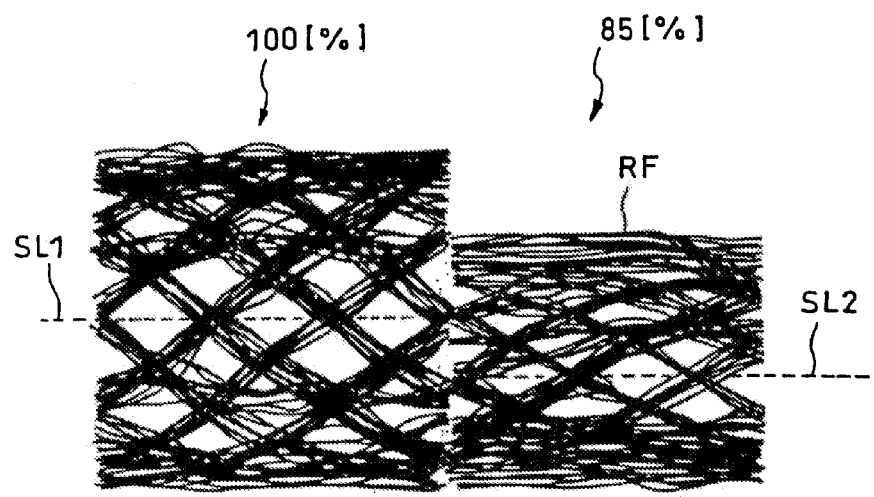
FIG. 10 is a signal waveform view showing a slice level change by a difference in the laser beam power in this first embodiment.

When observing the eye pattern as a continuous waveform, as shown in FIG. 10, slice levels SL1 and SL2 for properly binary-coding the regenerative signal are different between the case of 100% laser beam and the case of 85% laser beam. In other words, an asymmetry greatly varies between a portion of 100% laser beam and a portion of 85% laser beam.

Then, if the regenerative signal RF is binarized (binary-coded) according to a constant slice level of the case of 100% laser beam, it is difficult to generate a binary-coded signal according to a proper timing (i.e., timing synchronous with a basic period T), and a great jitter is generated in a reproductive clock. For this reason, it is difficult to properly reproduce the audio data recorded in a compact disk. Moreover, in the case where the regenerative signal by 85% laser beam is sliced according to the slice level SL1 set in the case of 100% laser beam, for example, when the amplitude of the regenerative signal is small like a regenerative signal having a period 3T, the signal level itself of the regenerative signal does not cross the slice level SL1. As a result, not only a jitter is increased, but also a bit error is frequently generated in a reproductive data reproduced by the binary-coded signal.

In general, a compact disk player is provided with an automatic slice level adjusting circuit for correcting a slice level in accordance with the aforesaid asymmetry. However, it is difficult to suitably cope with a sudden change of laser power; as a result, a very long burst error is generated in a portion just after the laser beam L power is changed over.

Figure 11:
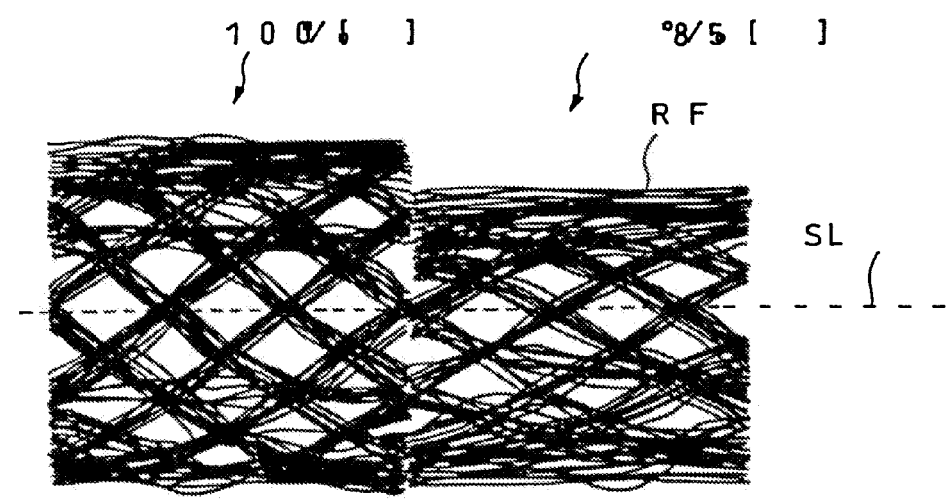
FIG. 11 is a signal waveform view showing a regenerative signal of a compact disk manufactured by the optical disk apparatus of the first embodiment shown in FIG. 1.

For this reason, in the optical disk apparatus 1, the edge position correcting circuits 7A and 7B correct a pit length formed on the disk master 2, and then, individually output modulation signals S1A and S1B for correcting a timing of the EFM modulation signal SB so that in the regenerative signal RF by 100% and 85% laser beam, the regenerative signal is binary-coded according to the identical slice level SL as shown in FIG. 11, and a binary-coded signal is generated according to a correct timing.

Further, at this moment, the edge position correcting circuits 7A and 7B individually detect a change patter of EFM modulation signal SB, and then, selectively output modulations signals S1A and S1B so as to reduce an interference between codes from an adjacent code in accordance with the change patter.

Namely, if the laser beam L power varies, a pit length varies; for this reason, a degree of interference between codes also varies in each laser beam power. Thus, the edge position correcting circuits 7A and 7B correct the timing of EFM modulation signal SB so as to reduce a jitter of the regenerative signal RF generated by the interference between codes.

A data selector 8 selects and outputs the corresponding modulation signals S1A and S1B in accordance with a change-over of the power of laser beam L, on the basis of the second information SE outputted from the image (character) signal generating circuit 6.

Figure 6:
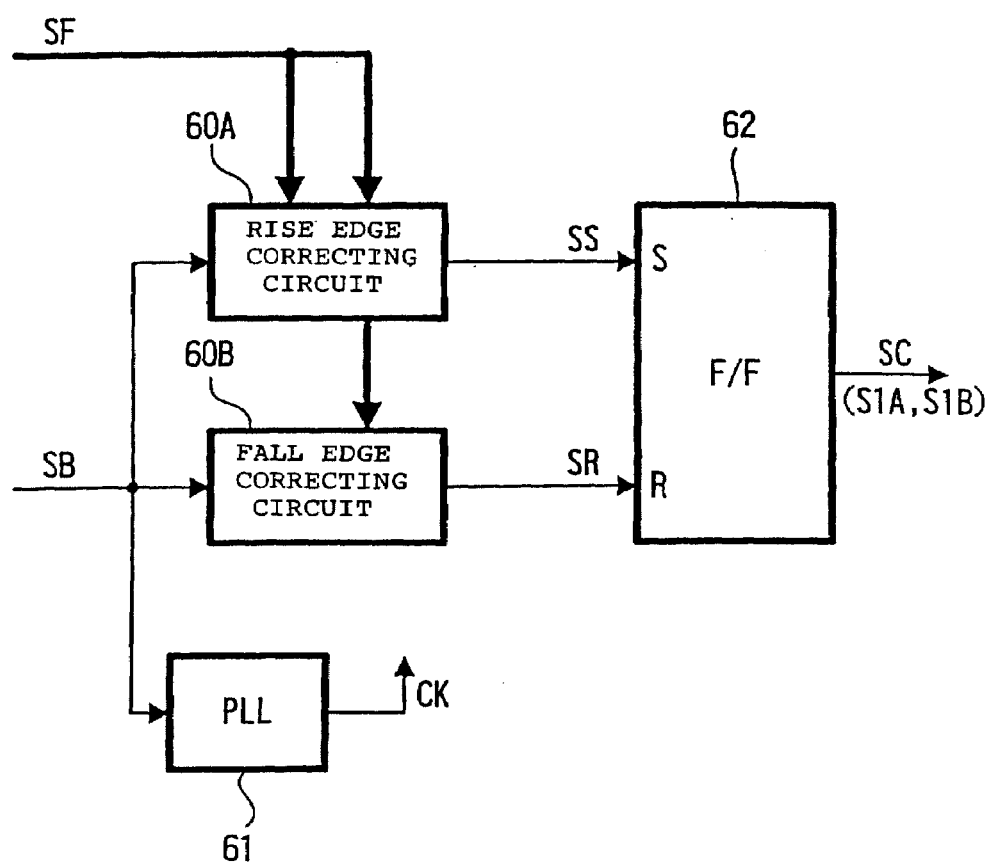
FIG. 6 is a block diagram showing a construction of an edge position correcting circuit of this first embodiment.

FIG. 6 is a block diagram showing a construction of the edge position correcting circuit 7A. Incidentally, the edge position correcting circuit 7B has the same construction as the edge position correcting circuit 7A except that a correction data stored in each of a rise edge correcting circuit 60A and a fall edge correcting circuit 60B is different, and therefore, the overlapping description is omitted.

In the edge position correcting circuit 7A, a PLL circuit 61 generates a channel clock CK from the EFM modulation signal SB, and then, outputs it. In this case, in the modulation signal SB, a signal level changes at a period of integer multiples of a basic period T; for this reason, the PLL circuit 61 generates a channel clock CK having a signal level changing at a basic period T synchronous with the modulation signal SB, and then, supplies the channel clock CK to the rise edge correcting circuit 60A and the fall edge correcting circuit 60B.

Figure 7:
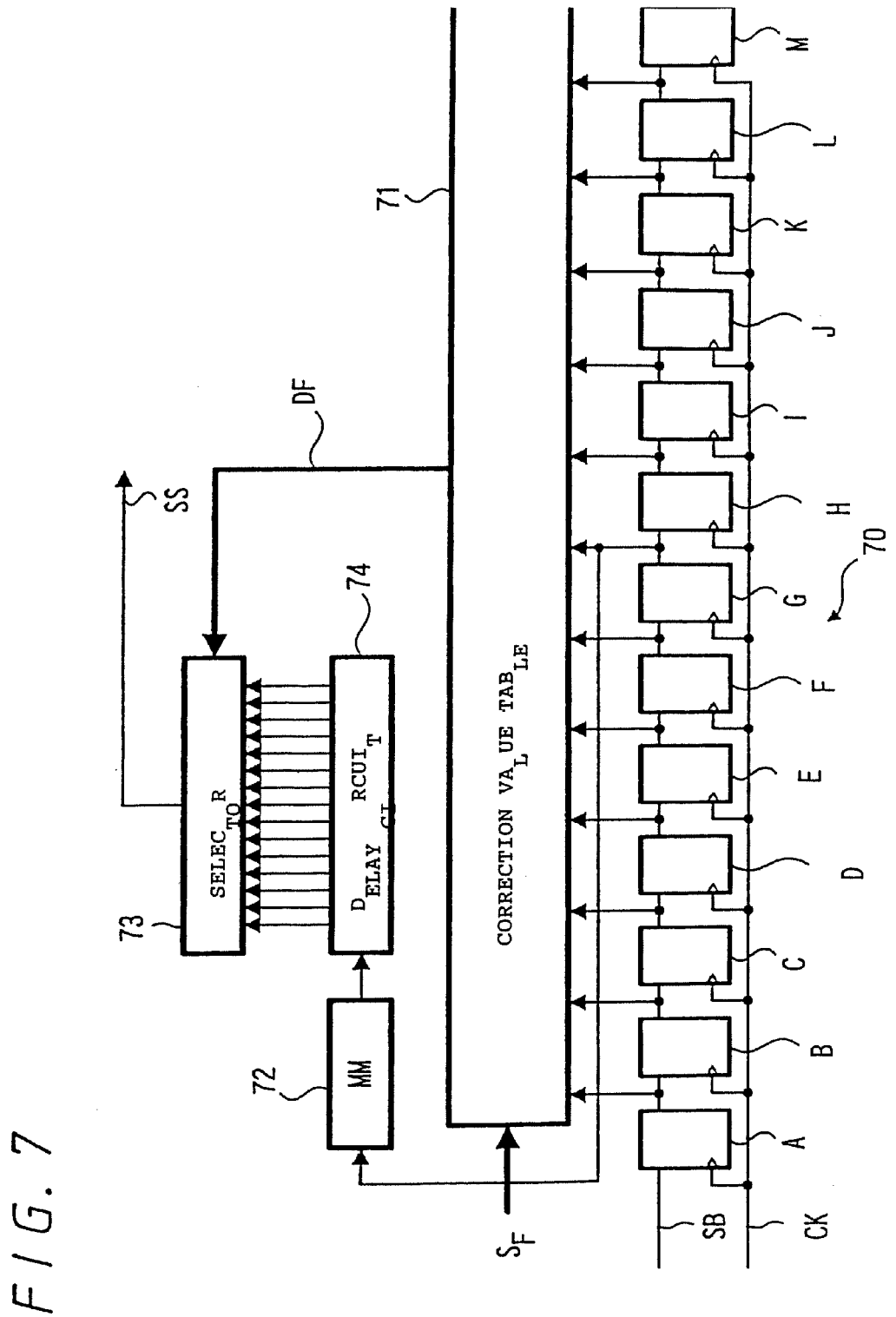
FIG. 7 is a block diagram showing a construction of a rise edge position correcting circuit of this first embodiment.

In the rise edge correcting circuit 60A, 13 latch circuits 70A to 70M operated by the clock CK are connected in series, as shown in FIG. 7, and the EFM modulation signal SB is inputted to the series circuit. The rise edge correcting circuit 60A samples the EFM modulation signal SB at the timing of channel clock CK, and thereafter, detects a change patter of the EFM modulation signal SB on the basis of the sampling results on continuous 13 points. More specifically, for example, in the case where a latch output "0001111000001" is obtained, it is possible to make the following decision; namely, the change pattern is a pattern in which a pit of a period 4T continues after a space of a period 5T. Likewise, in the case where a latch output "0011111000001" is obtained, it is possible to make the following decision; namely, the change pattern is a pattern in which a pit of a period 5T continues after a space of a period 5T.

A correction value table 71 comprises a memory storing a plurality of correction data, and latch outputs of the latch circuits 70A to 70M are inputted thereto as lower 13 pits. Moreover, a staircase signal SF is inputted thereto as upper 3 bits of address in an embodiment described later. The staircase signal SF reflects a power of recording laser beam at present. Namely, the correction value table 71 can output a correction value data corresponding to both the change pattern of the modulation signal SB and a change of the recording power. In this first embodiment, the laser power (output) is not changed like a stair, and therefore, the staircase signal SF is all set as 0.

A monostable multi-vibrator (MM) 72 receives a latch output from the central latch circuit 70G of the 13 latch circuits connected in series, and then, outputs a rise pulse signal having a signal level which rises up during a predetermined period (i.e., period shorter than a period 3T), on the basis of a rise timing of the latch output.

A delay circuit 74 has a 15-step tap output, and a delay time difference between taps is set as a resolution power of timing correction of the modulation signal in the edge position correcting circuit 7A. The delay circuit 74 successively delays a rise pulse signal outputted from the monostable multi-vibrator 72, and then, outputs it from each tap. A selector 73 selectively outputs a tap output of the delay circuit 74 according to the correction value data DF, and thereby, changes a delay time in accordance with the correction value data DF, and thus, selectively outputs a rise pulse signal SS.

Namely, the rise edge correcting circuit 60A generates a rise edge signal SS as shown in FIG. 12D. More specifically, in the rise edge signal SS, a signal level rises in response to a rise of signal level of the EFM modulation signal SB, and each rise edge delay time $\Delta r$ (3, 3), $\Delta r$ (4, 3), $\Delta r$ (3, 4), $\Delta r$ (5, 3) . . . to the EFM modulation signal SB, changes in accordance with the change pattern of the EFM modulation SB and a recording laser power.

Figure 12:
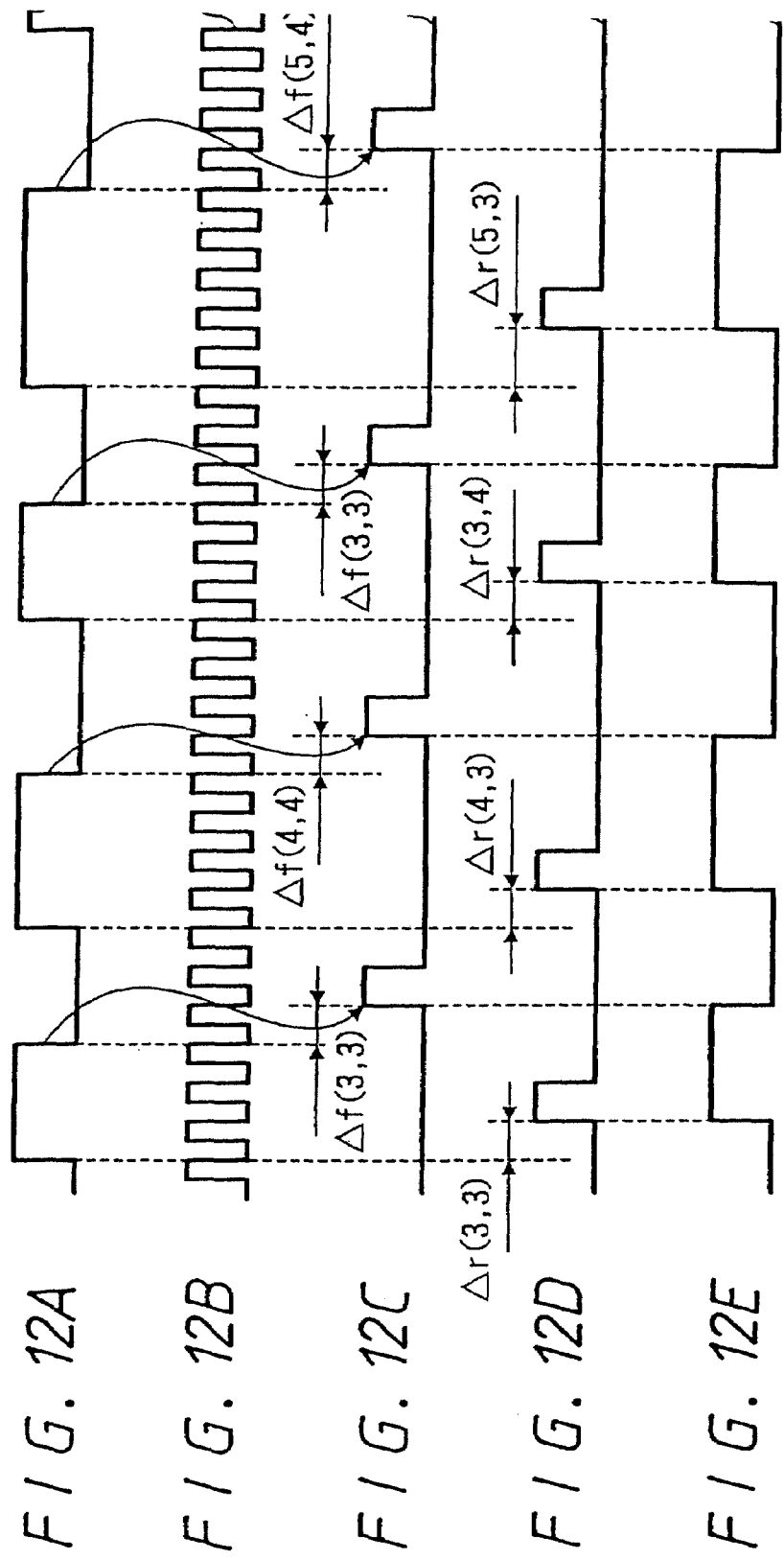
FIG. 12 is a signal waveform view showing an operation of the edge position correcting circuit of this first embodiment.

In FIG. 12, the change pattern of the modulation signal SB is expressed by a pit length p and a pit interval b with the use of one period a clock CK (i.e., channel clock) as a unit, and then, a delay time to a rise edge is expressed as $\Delta r$ (p, b). Therefore, in FIG. 12D, the secondary described delay time $\Delta r$ (4, 3) is a delay time in the case where there is a blank of 3 clock before a pit of 4 clock. Whereby the correction value table stores the correction value data DF corresponding to all of combinations of these p and b.

As described above, the rise edge correcting circuit 60A detects a pit patter formed on an optical disk and a recording laser power over a range of period 12T using a basic period as a unit. Then, the rise edge correcting circuit 60A generates a rise edge signal SS in accordance with the recording pattern and the recording laser power.

On the other hand, the fall edge correcting circuit 60B has the same construction as the rise edge correcting circuit 60A except that the monostable multi-vibrator 72 is operated on the basis of a fall edge of latch output, and the contents of the correction value table 71 differs from that of the rise edge correcting circuit 60A.

Thus, the fall edge correcting circuit 60B generates a fall edge signal SR as shown in FIG. 12C. More specifically, in the fall edge signal SR, a signal level falls in response to a fall of signal level of the EFM modulation signal SB, and each rise edge delay time $\Delta f$ (3, 3), $\Delta f$ (4, 3), $\Delta f$ (3, 4), $\Delta f$ (5, 3) . . . to the EFM modulation signal SB, changes in accordance with the change pattern of the EFM modulation SB and a recording laser power. Similar to the delay time with respect to the rise edge, the change pattern of the EFM modulation SB is expressed by a pit length p and a pit interval b, and a delay time with respect to the fall edge is expressed as $\Delta f$ (p, b).

Namely, the fall edge correcting circuit 60B detects a pit pattern formed on an optical disk and a recording laser power over a range of period 12T using a basic period as a unit. Then, the rise edge correcting circuit 60B corrects a timing of the fall edge of the modulation signal SB at the timing after the laser beam irradiation in accordance with the recording pattern and the recording laser power, and thus, generates a fall edge signal SR.

A flip-flop (F/F) 62 shown in FIG. 6 synthesizes the aforesaid rise edge signal SS and fall edge signal SR, and thereafter, outputs it. More specifically, the flip-flop 62 inputs the rise edge signal SS and the fall edge signal SR to a set terminal S and a reset terminal R, and thereby, generates a modulation signal S1A (S1B) in which a signal level rises at the rise of the signal level of the rise edge signal SS, and thereafter, a signal level falls at the fall of the signal level of the fall edge signal SR.

In the EFM modulation signal SB, a timing of the rise edge and the fall edge is corrected in accordance with a length and interval of adjacent pits, or in accordance with an exposure position of a radius direction, and thereafter, is outputted. In response to the above timing, a timing of irradiating the laser beam L to the disk master 2 is corrected in accordance with a length and interval of adjacent pits, or in accordance with an exposure position of a radius direction.

Thus, in the optical disk apparatus 1, a front edge position and a rear edge position of each pit are corrected so as to reduce a jitter generated by an interference between codes in reproducing. Moreover, the front edge position and the rear edge position are corrected by means of the edge position correcting circuits 7A and 7B corresponding to each power of the laser beam L, and thereby, even in the case where the power of laser beam L falls, the regenerative signal is binary-coded according to a constant slice level, and then, the front edge position and the rear edge position of each pit are corrected so as to securely reproduce the audio data SA recorded by the pit length.

More specifically, in the case where the power of laser beam L is 100%, the front edge position and the rear edge position are corrected by the modulation signal S1A outputted from the edge position correcting circuit 7A, and thereby, it is possible to properly generate a binary-coded signal according to the constant slice level. Moreover, in the case where the power of laser beam L is 85%, the front edge position and the rear edge position are corrected by the modulation signal S1B outputted from the edge position correcting circuit 7B, and thereby, it is possible to properly generate a binary-coded signal according to the same constant slice level as the case where the power of laser beam L is 100%.

As described above, according to the first embodiment, the positional information on laser beam irradiation position by the polar coordinate is converted into a positional information by the rectangular coordinate so that an image data is accessed, and then, in accordance with the image data, the laser beam power is changed. Whereby it is possible to readily and visibly record characters and images on an information recording surface of an optical information recording medium.

Description of Second Embodiment

A second embodiment of the present invention will be detailedly described below with reference to the accompanying drawings.

Figure 13:
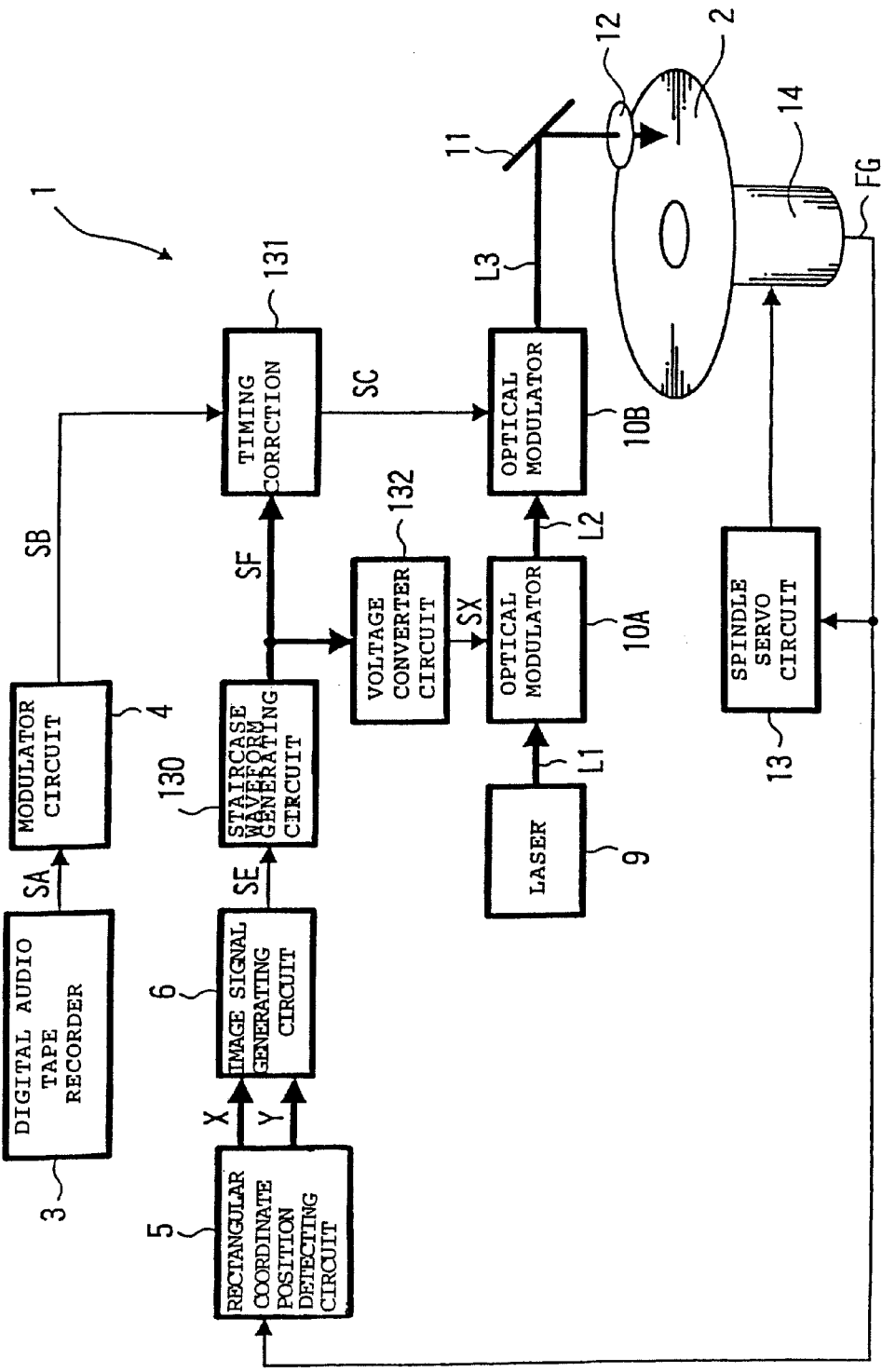
FIG. 13 is a block diagram showing a construction of an optical disk apparatus according to a second embodiment of the present invention.

FIG. 13 is a block diagram showing a construction of an optical disk apparatus according to a second embodiment of the present invention. In FIG. 13, like reference numerals are used to designate the parts corresponding to those shown in FIG. 1, and the details are omitted.

The second information outputted from the character signal generating circuit 6, obtained in the manner as described in FIG. 1, is inputted to a staircase waveform generating circuit 130. The staircase waveform generating circuit 130 detects a change of the second information, and then, generates 3-bit staircase signal SF such that an output value stepwise varies together with time. The staircase signal SF is converted into a signal SX having a stepwise voltage by means of a voltage converter circuit 132, and then, is inputted to an optical modulator 10A. Also, the staircase signal SF is inputted to an edge position correcting circuit 131.

The optical modulator 10A changes an output power of laser beam L1 according to the staircase signal SF whose voltage stepwise varies in accordance with the second information SE such as characters and figures. More specifically, in the case where the second information SE keeps a level "1" for a long time, the optical modulator 10A passes the laser beam L1 so that an output power of laser beam L2 becomes 100%. Conversely, in the case where the second information SE keeps a level "0" for a long time, the optical modulator 10A attenuates and passes the laser beam L1 so that an output power of laser beam L2 becomes 85%. In the case where the second information transfers from the level "0" to the level "1", the power of laser beam L1 is stepwise changed from a 85% power to a 100% power. Likewise, the case where the second information transfers from the level "1" to the level "0", the power of laser beam L1 is stepwise changed from a 100% power to a 85% power.

As described above, the optical modulator 10A outputs the laser beam L2 whose output power is variable between 100% and 85% powers, according to the output SF from the staircase waveform generating circuit 130. Sequentially, the laser beam thus obtained is turned on and off by means of an optical modulator 10B. More specifically, in the case where the signal SC outputted from the edge position correcting circuit 131 is a level "1", a laser beam L3 is turned on; conversely, in the case where the signal SC outputted from the edge position correcting circuit 131 is a level "0", the laser beam L3 is turned off.

The mirror 11 bends an optical path of the laser beam 3 so that the laser beam L3 is emitted toward the disk master 2, and then, the objective lens 12 converges a reflection light by the mirror 11 onto the disk master 2. These mirror 11 and objective lens 12 are successively moved to an outer circumferential direction of the disk master 2 by means of a thread mechanism (not shown) in synchronous with a rotation of the disk master 2, and thereby, an exposure position by the laser beam L3 is successively displaced to the outer circumferential direction of the disk master 2.

Thus, in the optical disk apparatus 1, in a state that the disk master 2 is rotatably driven, a spiral-like track is formed on the disk master 2 by moving the mirror 11 and the objective lens 12, and then, a pit is successively formed on the track in response to the modulation signal SC and the second information SE such as characters and figures.

The modulator circuit 4 receives an audio data SA outputted from a digital audio tape recorder 3, and then, adds the corresponding sub-code data to the audio data SA. Further, the modulator circuit 4 subjects the audio data SA and the sub-code data to data processing according to a compact disk format, and then, generates a modulation signal SB. More specifically, the modulator circuit 4 adds an error correcting code to the audio data SA and the sub-code data, and thereafter, subjects these data to interleaving and EMF-modulation processing. Whereby the modulator circuit 4 outputs an EFM-modulation signal SB having a signal level which varies at a period (period 3T to 11T) of integer multiples of a basic period T, with respect to the basic period T for pit formation.

In the optical disk apparatus conventionally used, the EFM-modulation signal SB generated in the above manner is transmitted to an optical modulator 10B as it is, and then, a light beam obtained from a laser 9 is turned on and off so that exposure is performed on the optical disk master 2.

In an optical disk manufactured according to the aforesaid conventional method, a state of regenerative signal varies depending upon a recording signal pattern, and this is a factor of generating a jitter. To give an example, in a disk recorded by using the conventional optical disk recording apparatus, the following phenomenon has been observed; more specifically, the minimum (smallest) size pit equivalent to a 3T signal is recorded in a state of always becoming smaller than an ideal size. For this reason, a signal from the pit corresponding the 3T signal is binary-coded at a predetermined level, and thereafter, when observing the signal, a pulse width becomes slightly shorter than that of the 3T signal, and this is a factor of generating a jitter.

Moreover, according to the conventional method, there is a problem that when a power of recording laser varies, the optimum binary-coded level varies in the generative signal. For this reason, if the laser power is changed between 100% and 85% outputs according to the second information SE expressing characters and figures as this embodiment, there is a problem that a player must change the binary-coded level according to the laser power. In a reproducing apparatus (player), in the case where a variation of the binary-coded level is not made well due to any causes, an error is generated in the conventional method; for this reason, it is impossible to carry out the aforesaid recording method.

In order to solve the above problem, according to this second embodiment, the output signal SB of the modulator circuit 4 is transmitted to the edge position correcting circuit 131. The edge position correcting circuit 131 detects a change pattern of the EFM modulation signal SB. Simultaneously, the staircase signal SF is transmitted to the edge position correcting circuit. Thus, the edge position correcting circuit 131 can correct an edge position according to information on both the change pattern of the EFM modulation signal SB and the recording laser power.

Then, in accordance with two kinds of information thus obtained, the edge position correcting circuit 131 outputs a modulation signal SC finely adjusting an edge position. More specifically, in the edge position correcting circuit 131, a change timing of the output signal SC is finely adjusted in accordance with a recording laser power (value from 85% to 100%) and the change pattern of EFM signal SB during recording (a pit length and a space length vary in a range from 3T to 11T), and thus, the modulation signal SC is outputted so that a jitter always becomes the best state. In this case, the edge position correction 131 has the construction as shown in FIG. 6.

Namely, the modulation signal SC passing through the edge position correcting circuit 131 is recorded by a predetermined laser power expressed by the staircase signal SF, and then, when reproducing a disk thus obtained, a signal including no jitter is obtained by binary-coding a regenerative signal according to a predetermined binary-coded level VL.

BY the way, the staircase signal SF is a signal made from the second information SE. The second information SE is constructed as a signal forming characters and figures in the case of visibly seeing a data recorded on the disk. Therefore, in the disk recorded according to this second embodiment, a pit width varies according to the second information SE; as a result, it is possible to see information such as characters and figures by visibly observing the disk surface.

Moreover, in this second embodiment, the laser power is slowly changed, and a proper correction is always carried out by means of the edge position correcting circuit 131 in response to the recording laser power; therefore, in any reproducing apparatus (player), it is possible to obtain a regenerative signal without causing a jitter. In addition, a change of the laser power is made large as compared with the conventional case; as a result, it is possible to record an information such as characters and figures, which is capable of being visibly observed more clear than the conventional case, onto the disk surface.

In all recording laser power, a correction is always made by means of the edge position correcting circuit 131; therefore, this serves to solve the following problem; more specifically, a pit formation is delicately different for each pattern. As a result, it is possible to manufacture a disk in which a jitter of the regenerative signal is synthetically lowered. Further, in this second embodiment, an edge position is adjusted for each recorded pattern; therefore, it is possible to remove a jitter depending upon the pattern, that is, a jitter generated by an interference between codes.

An output level of the laser beam L2 is varied between 100% power and 85% power by the output signal SC of the edge position correcting circuit 131 thus obtained, and then, the laser beam L2 is on-off controlled by means of the optical modulator 10B, and thus, is irradiated as a laser beam L3 onto the optical disk master 2.

As described above, an image to be drawn is binary-coded with the use of the rectangular coordinate system, and then, is recorded in an internal ROM of the character signal generating circuit 6. The information recorded in the ROM is inputted so that the coordinate system is transformed at a real time by means of the rectangular coordinate position detecting circuit 5, and then, is read out as it is, and thus, is successively recorded on the disk as a change of the recording laser power. However, in this case, when the output from the character signal generating circuit 6 transforms from a level 0 to a level 1, or from a level 1 to a level 0, the staircase waveform generating circuit 130 generates a staircase waveform SF so as to make gentle the output change.

Figure 14:
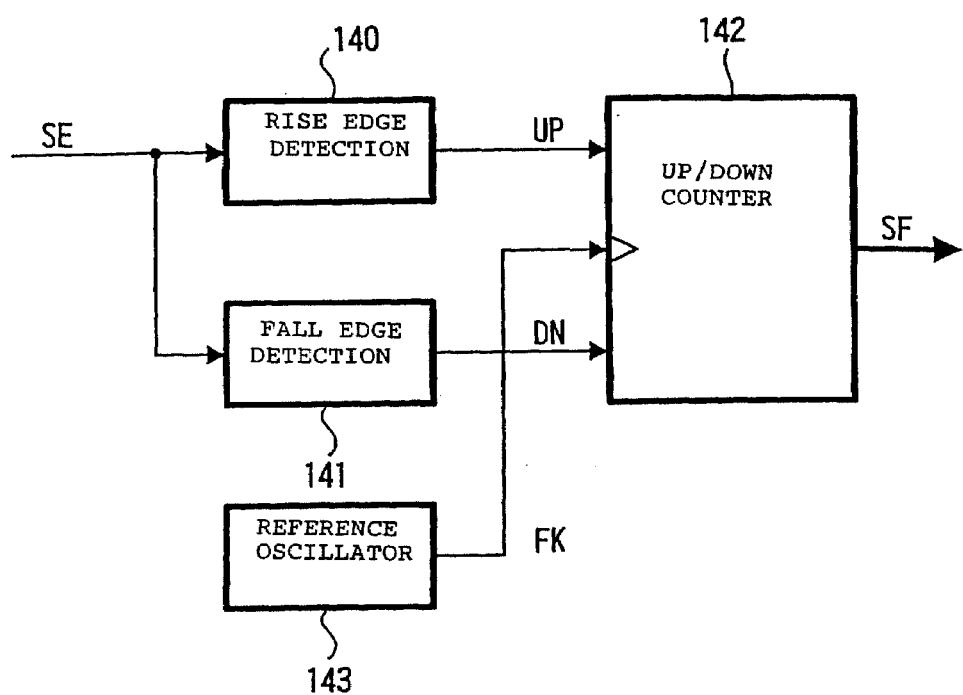
FIG. 14 is a block diagram to explain a construction of a staircase waveform generating circuit of this second embodiment.

FIG. 14 is a block diagram showing a construction of the staircase waveform generating circuit 130. As shown in FIG. 14, the change from the level 0 to the level 1 of the second information SE is detected by means of the rise edge detecting circuit 140, and then, is supplied to an up/down counter 142 as a signal UP whose level is kept at a level 1 for a predetermined time. The up/down counter 142 counts a reference clock FK from a reference oscillator 143 for the duration when the up signal UP is at a level 1 so as to count up an output value SF. On the other hand, the change from the level 1 to the level 0 of the second information SE is detected by means of the fall edge detecting circuit 141, and then, is supplied to an up/down counter 142 as a signal DN whose level is kept at a level 1 for a predetermined time. The up/down counter 142 counts a reference clock FK from a reference oscillator 143 for the duration when the down up signal DN is at a level 1 so as to count down an output value SF. The rise edge position detecting circuit 140 and the fall edge position detecting circuit 141 for carrying out the aforesaid operation may be composed of a monostable multi-vibrator, for example.

Figure 15:
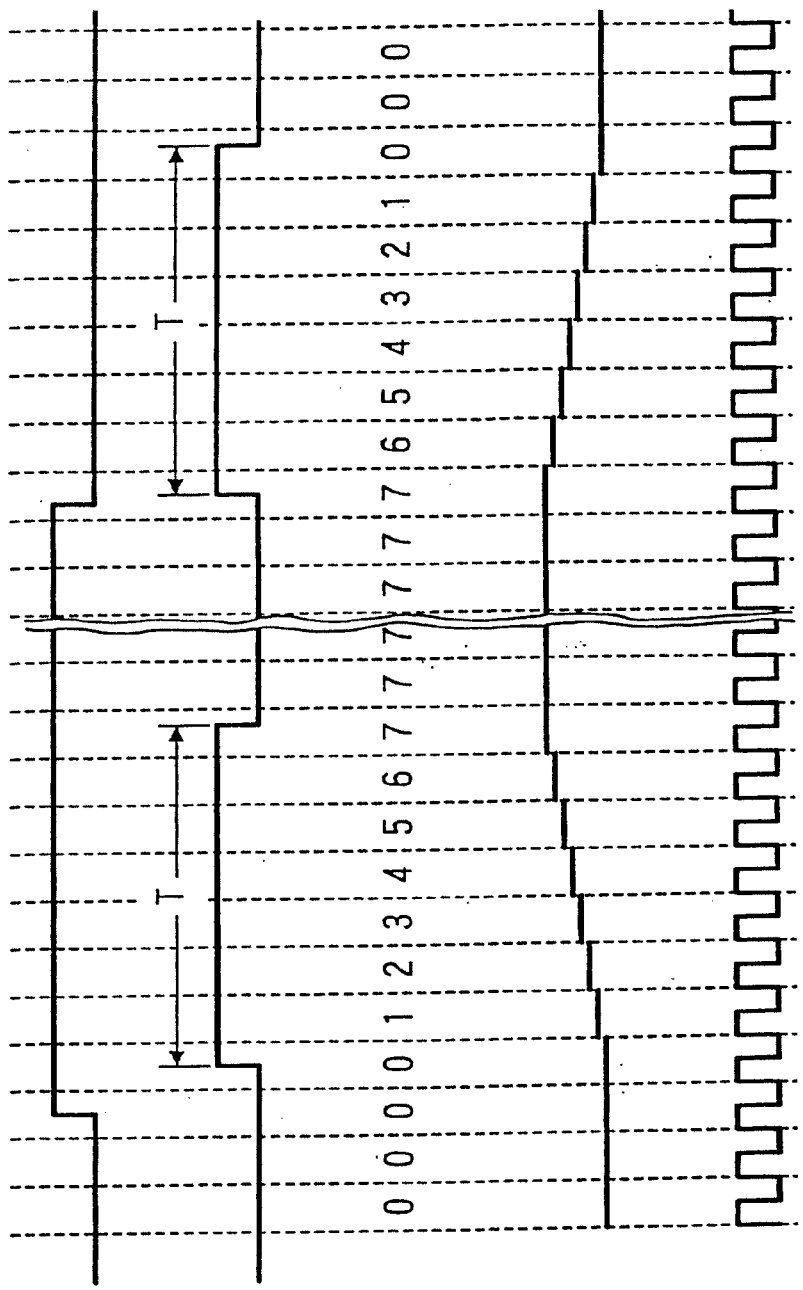
FIG. 15 is a timing chart to explain a count up operation and a count down operation of the staircase waveform generating circuit of this second embodiment.

An operation of the staircase waveform generating circuit 130 having the aforesaid construction will be described below with reference to FIG. 15. When a rise edge of the second information SE as shown in the first half of FIG. 15A is generated, the rise edge detecting circuit 140 outputs a pulse UP which becomes a level 1 for only time T as shown in FIG. 15B. In this case, the up/down counter 142 carries out a count-up operation at a period of the reference clock FK as shown in FIG. 15E so that a count value SF is successively increased from 0 to 7. Incidentally, although not shown, an up/down counter 142 is constructed so as to stop the count-up operation in order to prevent an overflow when the count value becomes 7.

On the other hand, when a fall edge of the second information SE as shown in the second half of FIG. 15A is generated, the fall edge detecting circuit 141 outputs a pulse DN as shown in FIG. 15B. In this case, the up/down counter 142 carries out a count-down operation at a period of the reference clock FK as shown in FIG. 15E so that a count value SF is successively decreased from 7 to 0 as shown in FIG. 15C. Incidentally, although not shown, an up/down counter 142 is constructed so as to stop the count-down operation in order to prevent an underflow when the count value becomes 0.

Figure 16:
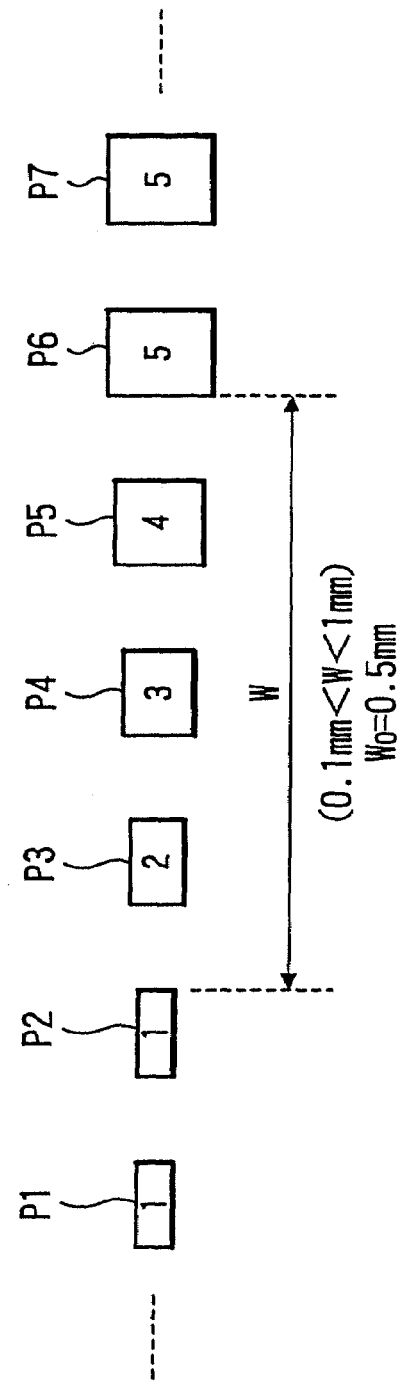
FIG. 16 is a view showing a transition area of a pit width of a second information in this second embodiment.

FIG. 16 is a view showing a transition area of pit width of the second information according to this second embodiment. On the basis of the output SF from the staircase waveform generating circuit 130, the optical disk master is finally formed with a pit line as shown in FIG. 16 such that a width is variable according to the second information. In FIG. 16, a numeral shown in each of pits P1 to P7 relatively shows a stepwise level concerning a size of the pit width. More specifically, pits P1 and P2 have the minimum pit width "1", the pit P3 has a larger pit width "2", the pit P4 has a further larger pit width "3", the pit P5 has a further larger pit width "4", and the pits P6 and P7 have the maximum pit width "5". A range from the terminal end of the pit P2 to the distal end of the pit P6 is a transition area W where the pit width of the second information is stepwise changed. The transition area W is recorded on a compact disk as a second information in a predetermined range (e.g., W<1.0 mm), and thus, a record of characters and figures can be visibly confirmed. If the transition area is too long (e.g., W>1.0 mm), the second information recorded on an optical disk is indefinite, and in the case of seeing the surface of the optical disk, it is difficult to recognize an image information recorded as the second information. Conversely, if the transition area is too short (e.g., W<0.1 mm), no effect by the transition area is obtained. Therefore, it is preferable that a length of the transition area is set to a range of 0.1 mm<W<1 mm. According to the experiment made by the present applicant, the best transition area is the case where Wo=0.5 mm. In this second embodiment, the output signal SF of the staircase waveform generating circuit 130 is set so that the aforesaid transition area of the pit width can be obtained.

As described above, the output of the up/down counter 142 outputs a staircase signal SF such that the output value successively varies from 0 to 7 according to the change of the second information SE. The staircase signal SF is converted into an analog voltage SX controlling the optical modulator 10A by means of a voltage converter circuit 132 having a construction as shown in FIG. 17. A signal SX converted into the analog voltage becomes a staircase waveform as shown in FIG. 15D such that its value gradually varies in the vicinity of the change of the second information.

In the voltage converter circuit 15 having a construction as shown in FIG. 17, the staircase signal SF is connected as an address signal of a read only memory (ROM) 170. The ROM 170 previously calculates and records what the laser power should take a value in accordance with the staircase signal SF having the count values from 0 to 7. To give an example, the following is a description on the case where the laser power is changed from 100% to 85% as described in the first half of this second embodiment. For example, in the case where a value of the staircase signal SF is 7, a numerical value 100 is recorded in response to an address 7 because a 100% laser power is expected. Further, in the case where a value of the staircase signal SF is 0, a numerical value 85 is recorded in response to an address 7 because a 85% laser power is expected. Further, in the case where the staircase signal SF has the values from 1 to 6, a value calculated from a proportional distribution between 100 and 85 is recorded.

Of course, the aforesaid example is the case on the assumption that a 100% laser power is outputted when the output of the ROM 170 is 100. In fact, taking a conversion gain of a D/A converter 171 and a conversion efficiency of the optical modulator 10A into consideration, there is a need of determining the value to be recorded in the ROM 170. Moreover, there is the case where there is no linear relationship between the laser output power and an input voltage to the optical modulator 10A; in such a case, a properly changed value need to be recorded in the ROM 170.

In the manner as described above, the laser output value read from the ROM 170 is converted into an analog voltage value SX by means of the D/A converter 171, and then, is supplied to the optical modulator 10A, and thus, the output power from the laser 9 is controlled. In a laser beam L2 thus obtained, its output power is gradually and stepwise increased or decreased according to the staircase signal SF (see FIG. 15D).

The correction value table 71 provided in the edge position correcting circuit 131 previously records a correction value according to the staircase signal SF inputted as a higher address.

This correction value table is made in a manner of preparing individual optical disks for evaluation with respect to all of 8-stage recording laser powers, and directly calculating a correction value from their regenerative signals. Moreover, like another embodiment described later, for example, the optical disk for evaluation is set to have different two recording powers, and then, a correction value table of other recording powers may be prepared by using a mathematical operation (calculation) such as interpolation or extrapolation.

In the aforesaid optical information recording apparatus of this second embodiment, the modulator circuit 4 constitutes a modulation signal generating (making) means for generating a modulation signal SB which is variable in accordance with the first information SA. The staircase signal generating circuit 130 constitutes a time changing signal generating (making) means for generating a time changing signal SF which is timely variable according to the second information SE. The optical modulator 10A constitutes a laser power (light quantity) changing means which changes a laser power according to the time changing signal SF; on the other hand, the optical modulator 10B constitutes an optical modulation means which makes an on-off control of the laser beam L1 obtained by the laser power changing means 10A according to the modulation signal SB.

Thus, the optical information recording apparatus of this second embodiment comprises: a modulation signal generating means for generating a modulation signal SB which is variable in accordance with the first information; a time changing signal generating (making) means for generating a time changing signal SF which is timely variable according to the second information; a laser power changing means which changes a laser power according to the time changing signal; and an optical modulation means which makes an on-off control of a laser beam obtained by the laser power changing means according to the modulation signal. The laser beam by the second information is gently changed. Accordingly, in the optical information recording apparatus of the present invention, for example, in addition to an information (first information) such as a music and a video determined based on the CD or DVD standards, it is possible to record a second information which is not determined in the CD or DVD standards in the identical disk. Further, in a optical disk manufactured by the optical information recording apparatus of the present invention, a regenerative signal characteristic does not suddenly vary in the vicinity of a changing point of the second information, and therefore, it is possible to stably reproduce the information.

Further, in the optical information recording apparatus of this second embodiment, the modulation signal generating means comprises: a first modulation signal generating for generating a first modulation signal by changing over a signal level at a period of integer multiples of a predetermined basic period in accordance with the first information; a change pattern detecting means for detecting a change pattern of the first modulation signal; and a timing correcting means for correcting a change timing of the first modulation signal according to both the time changing signal and the change pattern so as to generate a second modulation signal. Thus, the change timing of the recording signal is corrected in accordance with a change of laser power and a change pattern of recording signal. Accordingly, an optical disk recording information by the optical information recording apparatus of the present invention has a very preferable signal characteristic. Further, it is possible to more largely set a change rate of laser power for recording the second information; as a result, the second information can be more clearly recorded in the optical disk.

Moreover, according to the optical information recording method of this embodiment, the first information is recorded by mainly turning on and off controlling the laser beam, and the second information is recorded by mainly changing a light intensity of the laser beam, and thus, the light intensity of the laser beam is timely gently changed. Further, a timing for turning on and off the laser beam is adjusted according to both the first information and the light intensity of the laser beam. Accordingly, according to the optical information recording method of the present invention, in addition to an information (first information) such as a music and a video determined based on the CD or DVD standards, it is possible to record a second information which is not determined in the CD or DVD standards in the identical disk. Further, it is possible to more largely set a change rate of laser power for recording the second information; as a result, the second information can be more clearly recorded in the optical disk.

In an optical information recording medium of this second embodiment, the first information is recorded by mainly changing a pit length and position, and the second information is recorded by mainly changing a pit width. The pit width for recording the second information is stepwise variable. The pit length and position are finely adjusted by a signal patter recorded as a pit and a pit width. Accordingly, in the present invention, in addition to an information (first information) such as a music and a video determined based on the CD or DVD standards, it is possible to obtain a medium which records a second information which is not determined in the CD or DVD standards in the identical disk. Further, visibly recognizable graphic information such as characters and figures is recorded in a disk signal area (section) as a second information, and thereby, it is possible to provide a value added disk. In addition, the graphic information of the optical information recording medium of this embodiment is capable of more clearly confirmed as compared with the conventional method.

Description of Third Embodiment

A third embodiment of the present invention will be described below with reference to the accompanying drawings.

Figure 18:
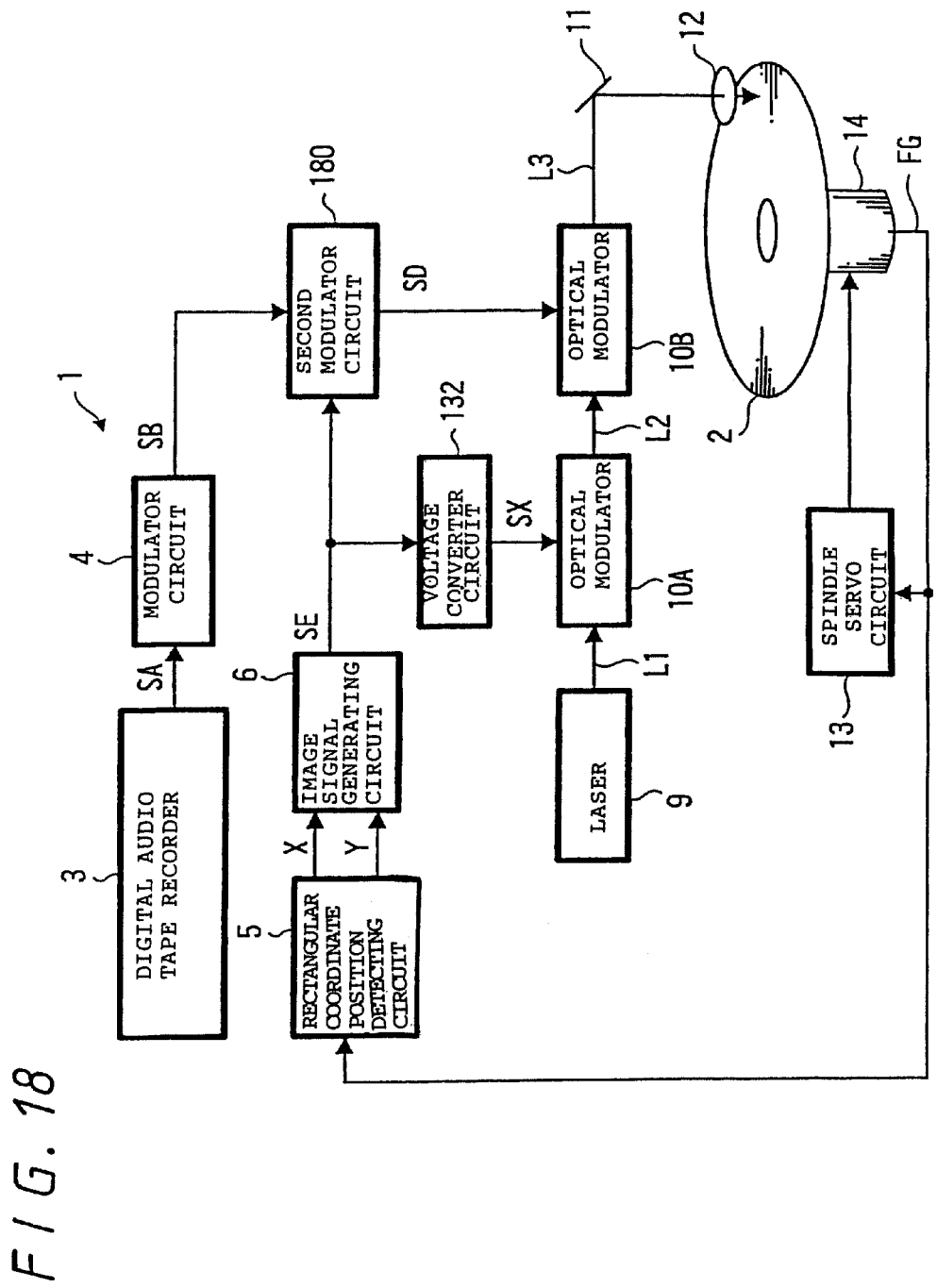
FIG. 18 is a block diagram showing a construction of an optical disk apparatus according to a third embodiment of the present invention.

FIG. 18 is a block diagram showing a construction of an optical disk apparatus according to the third embodiment. In FIG. 18, like reference numerals are used to designate the parts corresponding to those shown in FIG. 1, and the details are omitted.

A second modulation circuit 180 inputs the EFM modulation signal SB and the second information SE, and overlaps the second information SE with the EFM modulation signal SB so as to hinder a recording information to be recorded as an EFM signal, and thus, outputs an signal SD.

Figure 19:
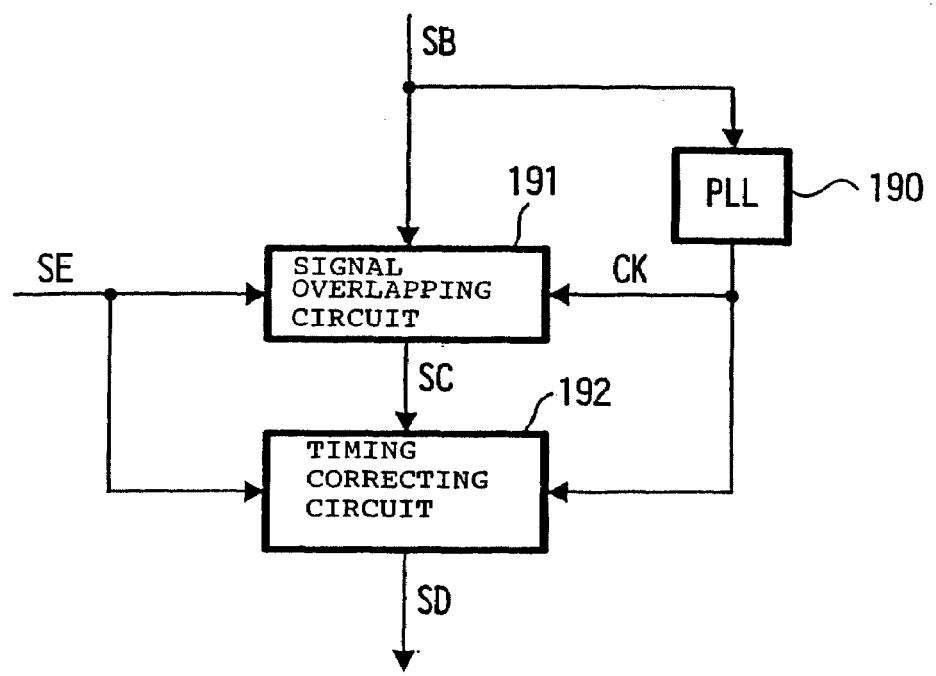
FIG. 19 is a block diagram showing a construction of a second modulator circuit of this third embodiment.

The second modulation circuit 180 has a construction as shown in FIG. 19. In this case, a PLL circuit 190 generates a channel clock CK which varies every the minimum change unit of the EFM signal SB, and then, supplies the channel clock CK to a signal overlapping circuit 191 and a timing correcting circuit 192. In the case where the second information SE is a logic "0", the signal overlapping circuit 191 outputs the second information SE as a signal SC without adding any modification to the inputted EFM signal SB. Conversely, in the case where the second information SE is a logic "1", the signal overlapping circuit 191 investigates a length of pit formed by a signal patter of the inputted EFM signal, and then, if a decision is made such that a length of the formed pit is 9T or more, the signal overlapping circuit 191 makes a conversion such that a signal originally recorded as one pit into is replaced with a signal recorded as two pits and one space, and thus, outputs it as a signal SC.

The signal SC, in which the second information SE is overlapped as described above, is transmitted to the timing correcting circuit 192, and then, the signal change timing is finely adjusted so as to improve a quality of regenerative signal (to reduce a jitter), and thus, the signal SC is outputted as a signal SD.

As described above, the second information SE is recorded on the disk master 2 as a power change of the laser beam L2 by means of the optical modulator 10A. Simultaneously, the second modulator circuit 180 converts a signal according to the second information SE, and then, the optical modulator 10B turns on and off the laser beam according to the signal, and thereby, the signal is recorded on the disk master 2. More specifically, the signal is modulated double according to the second information, and then, is recorded on the disk master 2; therefore, it is possible to record the second information with a contrast higher than the conventional method. Further, the change timing of the recording signal is corrected by means of the timing correcting circuit 92; therefore, it is possible to manufacture a preferable disk which has almost no a jitter.

Figure 20:
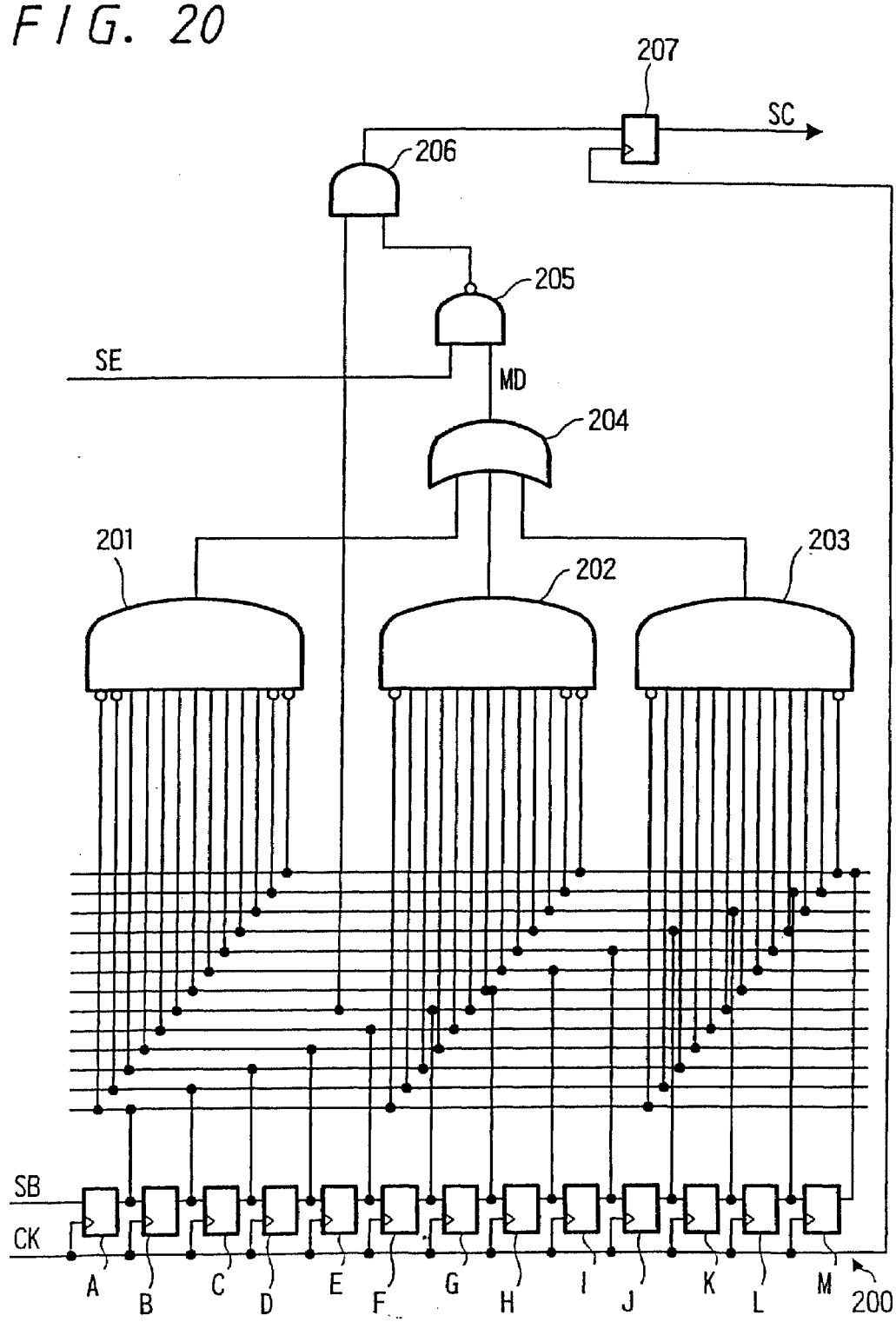
FIG. 20 is a block diagram showing a construction of a signal overlapping circuit of the second modulator circuit of this third embodiment.

FIG. 20 is a view to explain a construction of the signal overlapping circuit 191 for performing the signal conversion as described above. In FIG. 20, the EFM signal SB is operated by the channel clock CK, and is inputted to 13 latch circuits 200A to 200M which are connected in series. These 13 latch circuits 200A to 200M sample the EFM signal SB at a timing of the channel clock CK, and then, a change pattern of the EFM signal SB is detected from the sampling result on continuous 13 points. More specifically, for example, in the case where a latch output "0011111111100" is obtained, it is possible to make a decision that the change patter is a pattern in which a pit having a length 9T is formed.

AND gates 201 to 203 detect a pit having a length 9T or more from the outputs of 13 latch circuits 200A to 200M. More specifically, the AND gate 201 makes a detection that a pit having a length 9T is recorded by outputting a logic "1" in the case where the output of 13 latch circuits 200A to 200M is "0011111111100". Likewise, the AND gate 202 makes a detection that a pit having a length 10T is recorded by outputting a logic "1" in the case where the output of 13 latch circuits 200A to 200M is "0111111111100". Moreover, the AND gate 203 makes a detection that a pit having a length 11T is recorded by outputting a logic "1" in the case where the output of 13 latch circuits 200A to 200M is "0111111111110".

An output signal MD of an OR gate 204 is obtained by calculating a logic OR of the outputs from the AND gates 201, 202 and 203, and then, the OR gate 204 outputs an signal MD which becomes a logic "1" when any of pits having lengths 9T, 10T and 11T is recorded.

In an output of the latch circuit 200F, the EFM signal SB is delayed by 7 clocks, and then, appears.

For example, in the case where the pit having a length 9T is recorded, when the latch circuit 200F outputs a 9T pit signal, the signal MD becomes a logic "1" at the substantially central portion of the 9T pit signal.

A NAND gate 205 calculates a logical product of the second information SE from the character signal generating circuit 6 and a pit detection signal MD of 9T pit or more from the OR gate 204, and thereafter, inverts a logic, and then, outputs the inverted logic. More specifically, in the case where the second information SE from the character signal generating circuit 6 is a logic "0", the output of the NAND gate 205 always becomes a logic "1". An AND gate 206 calculates a logical product of the output of the NAND gate 205 and the output of the latch circuit 200F, and then, outputs it. Therefore, in the case where the second information SE from the character signal generating circuit 6 is a logic "0", the output of the latch circuit 200F appears as the output of the AND gate 206.

In other words, in the case where the second information SE from the character signal generating circuit 6 is a logic "0", in the output of the AND gate 206, an input EFM signal SB is merely delayed.

On the other hand, in the case where the second information SE from the character signal generating circuit 6 is a logic "1", the output of the AND gate 206 is forcedly modified into a logic "0" when the 9T or more pit detection signal MD is a logic "1". Thus, in the case where the 9T or more pit signal is detected, the output of the AND gate 206 is converted into a signal such that the central portion of the 9T or more pit signal becomes 0.

Figure 21:
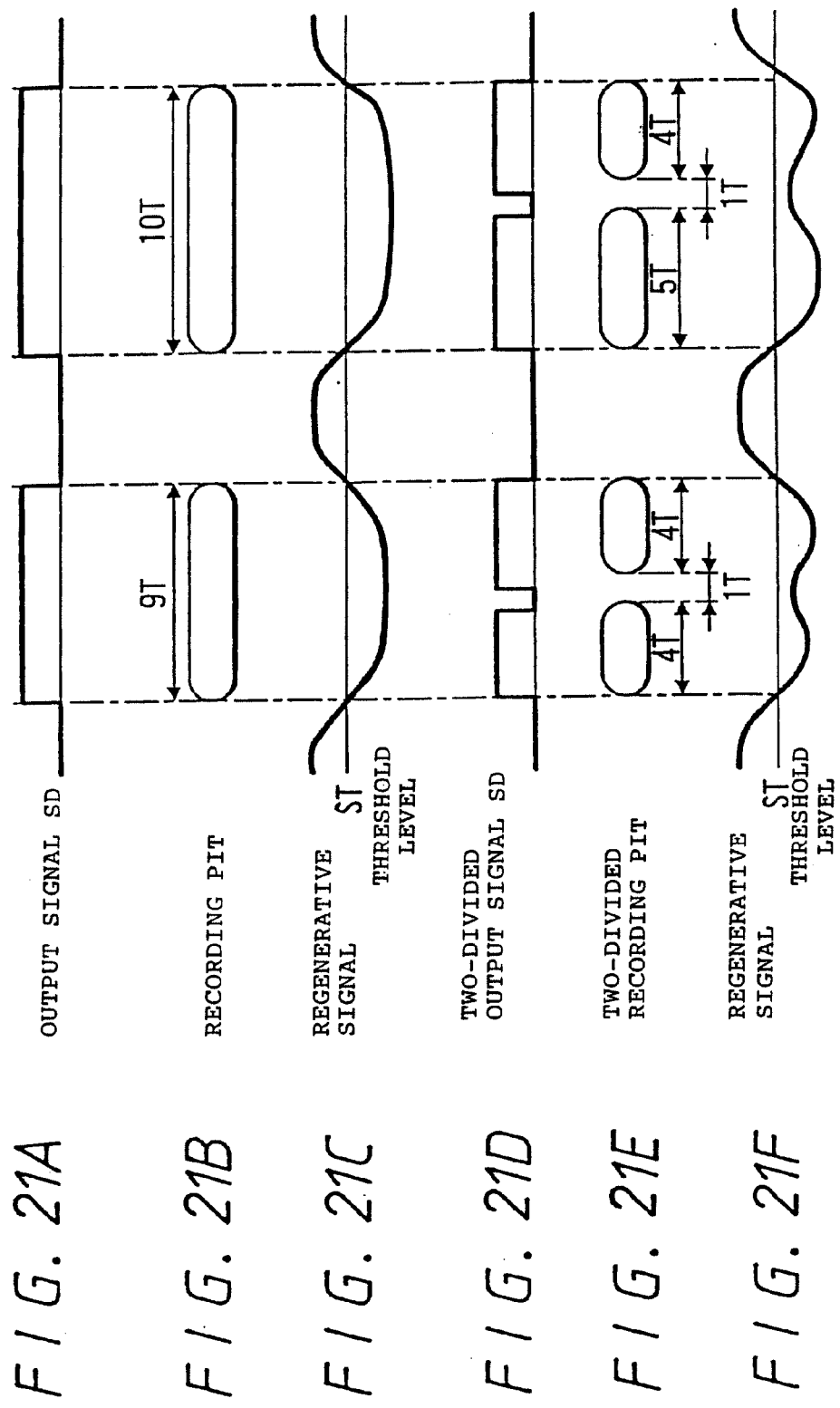
FIG. 21 is a view schematically showing an output signal from the second modulator circuit of this third embodiment, a pit obtained from the result and a regenerative signal expected from the pit.

A latch circuit 207 latches the output of the AND gate 206 at a channel clock CK unit, and thereby, shapes a waveform, and then, transmits the waveform as an output signal SC to the timing correcting circuit 192. As a result, for example, a pulse having a length 9T as shown in FIG. 21A is modified into two pulses having a length 4T and a blank having a length 1T at the middle portion between these two pulses, as shown in FIG. 21D, and thus, is recorded. Likewise, a pulse having a length 10T is modified into a pulses having a length 5T, a blank having a length 1T and a pulse having a length 4T, and thus, is recorded. When a pit is recorded according to the aforesaid pulse, it is considered that as shown in FIG. 21B and FIG. 21E, a pit is recorded according to each pulse.

FIG. 21C and FIG. 21F are schematic views showing a expected regenerative signal. The recording method of this third embodiment is employed, and thereby, a pit line is recorded as two pits and a blank having a length 1T at the middle portion between these two pits. The pit line generates a regenerative signal as shown in FIG. 21F in the case of being read by means of an ordinary pickup. Such a generative signal is compared with a general threshold level ST, and then, is binary-coded. In this case, it can be seen that a timing crossing the threshold level ST is the same as that shown in FIG. 21C. Thus, according to the aforesaid method, even if a pit having a length of 9T or more is divided into two so as to be recorded, it can be seen that there is no generation of a jitter. Therefore, it is possible to reproduce an information recorded as the EFM signal SB without giving an influence thereto.

Figure 22:
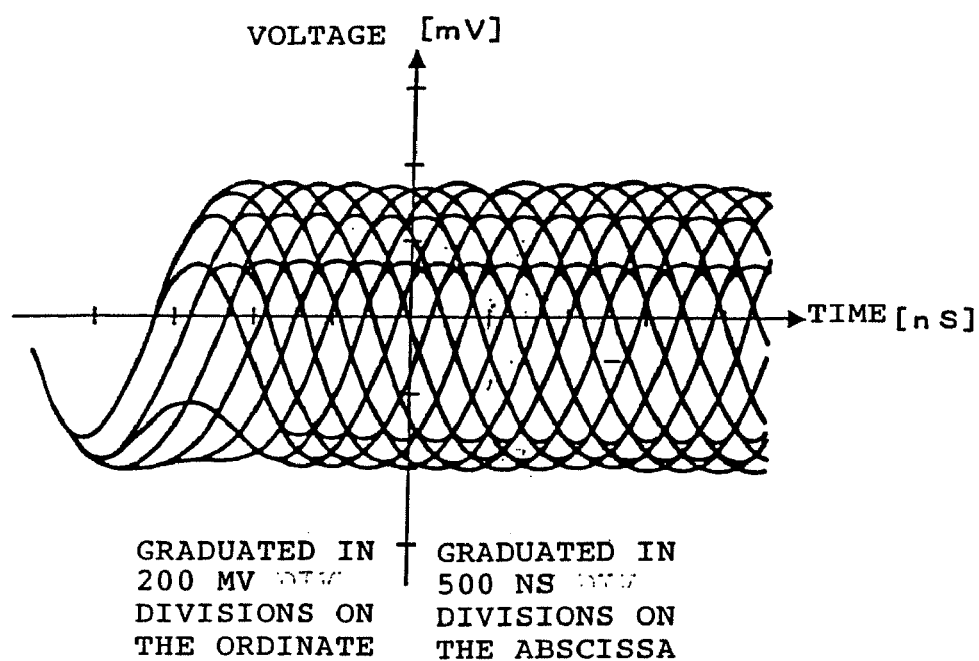
FIG. 22 is a view showing a regenerative waveform in the case of recording the output signal of the second modulator circuit of this third embodiment on an optical disk.

In the above manner, the experiment of dividing the pit into two parts was carried out, and thereafter, an actually obtained regenerative signal was shown in FIG. 22. According to expectation, it can be seen that there is no influence to a signal in the vicinity of the threshold level.

As is evident from the above description, the pit having a length of 9T or more is divided into two, and thereby, it is possible to record the second information. In comparison with the pit line recorded in this manner (e.g., comparing FIG. 21B with FIG. 21E), in the case where the pit having a length of 9T or more is divided into two, it can be seen that the total area of pit is reduced. Thus, the second information is set a value different from other area in a certain area on a disk, and when the aforesaid pit is recorded, the area is formed so that the total area of the pit is different from other area. In the case where a human being visibly observes such a disk, a light quantity proportional to the total area of the pit is observed. Thus, the human being visibly observing the disk see as if only specific area on the disk has a different color according to the second information. In this manner, it is possible to record patterns such as characters and designs on the disk without giving an influence to the EFM signal SB.

According to the method described in this third embodiment, an intensity of the recording laser beam L2 is previously modulated according to the second information SE. More specifically, as described before, in the case where the second information is a logic "1", the intensity of the laser beam L2 is lowered to a 85% power, and in the case where the second information is a logic "0", the intensity of the laser beam L2 is a 100% power as it is unchanged. In this case, a width of the pit recorded on the disk is variable according to an intensity of the laser beam.

Therefore, in the case where the second information is a logic "1", the intensity of the laser beam is lowered; for this reason, the pit width becomes narrow. Further, in the case where the second information is a logic "1" a pit having a length 9T or more is divided into two parts. The aforesaid two effects both serve to reduce the total area of the pit; as a result, the second information recorded on an optical disk according to the method of this third embodiment can be more clearly observed as compared with the conventional method.

FIG. 23 is a view illustrating a state of pit recorded according to the method of this third embodiment. In the case where the second information is a logic "0", the pit is not divided into two parts, and the recording laser power is 100%; therefore, a pit line as usually (see FIG. 23A) is recorded. However, in the case where the second information is a logic "0", the pit having a length of 9T or more is divided into two parts, and further the recording laser output is lowered to a 85% power; therefore, the pit width is relatively reduced. More specifically, a pit width (W1) of the FIG. 23A case of becomes wider than a pit width (W2) of the 23B case. Further, as shown in FIG. 23C, a recording pit having a depression at the middle portion between two recording pits may be formed without fully diving the recording pit into two parts as shown in FIG. 23B, and even if the second information is recorded on the optical disk in this manner, it is possible to sufficiently visibly recognize an information such as characters and images. On the contrary, even if the second information is recorded on the optical disk so that the middle portion between two recording pits is formed so as to be bulged, likewise, it is possible to sufficiently visibly recognize an information such as characters and images. Namely, the middle portion between two recording pits may be formed so as to have a width relatively different from a recording pit.

When the pit width is varied as described above, there is the possibility that a jitter is generated in the regenerative signal. In the regenerative signal from the optical disk, there exists an interference between codes from the pattern recorded before and front; for this reason, a jitter is generated. In this third embodiment, in order to solve the above problem, and to manufacture a high quality disk, a signal obtained from the signal overlapping circuit 191 is supplied to the timing correcting circuit 192 so that the signal SD correcting a position on a change point of the recording signal can be generated. In this third embodiment, according to the signal SD thus obtained, the optical modulator 10B turns on and off the laser beam L2, and thereby, it is possible to record both information obtained from the digital audio tape recorder and the second information SE obtained from the character signal generating circuit 6 in the disk surface.

The timing correcting circuit 192 detects a change pattern of the signal SC. Simultaneously, the second information SE is transmitted to the timing correcting circuit 192. Thus, the timing correcting circuit 192 can correct a timing according to both information of the change pattern of the recording signal SC and the recording laser power.

Then, in accordance with two information thus obtained the timing correcting circuit 192 outputs a modulation signal SD which finely adjusts an edge position. More specifically, in the timing correcting circuit 192, a change timing of the output signal SD is finely adjusted in accordance with a recording laser power (85% or 100% power value) and a change pattern of the recording signal SC (a pit length and a apace length vary), and then, the modulation signal SD is outputted so that a jitter always becomes the best state. In this case, the timing correcting circuit 192 has the same construction as the edge position correcting circuit 7 shown in FIG. 6.

More specifically, the modulation signal SD passing through the timing correcting circuit 192 is recorded by a predetermined laser power determined according to the second information. As a result, when the disk thus obtained is reproduced and the regenerative signal is binary-coded according to a predetermined binary-coded level, a signal containing no jitter can be obtained.

Correction is always made with respect to all of the recording laser power by means of the timing correcting circuit 192; therefore, it is possible to avoid a problem that a formation of the pit is slightly different for each pattern. As a result, it is possible to manufacture a disk which can make synthetically lower a jitter generated in a regenerative signal. Moreover, in this third embodiment, an edge position is adjusted for each recorded pattern; therefore, it is possible to remove a jitter depending upon the pattern, that is, a jitter generated by an interference between codes.

The modulation signal SC and the second information supplied to the timing correcting circuit 192 are connected to the rise edge correcting circuit 60A and the fall edge correcting circuit 60B shown in FIG. 6. In the signal SD, the rise edge timing and the fall edge timing are corrected in accordance with the recording pattern (determined by pit and space length) and the recording power, and thus, the corrected signal SD is outputted.

According to the output signal SD of the timing correcting circuit 192 thus obtained, the laser beam L2 is on/off-controlled by means of the optical modulator 10B so that the output level is variable between a 100% power and a 85% power, and thus, is irradiated to the disk master 2 as a laser beam L3.

In the rectangular coordinate position detecting circuit 5, as shown in FIG. 2, the count value RX of the one-rotation count circuit 20 and the count value TK of the track count circuit 21 are equivalent respectively to the angular information and the radius information in the case of expressing a position recording at present by the polar coordinate. Thus, the coordinate transforming circuit 22, to which these two values are inputted, can calculate and output positional information X and Y on the rectangular coordinate system. The positional information X and Y on the rectangular coordinate system are transformed as described above, and thereafter, is transmitted to the character signal generating circuit 6.

As described above, in the internal ROM of the character signal generating circuit 6, an image to be drawn is binary-coded with the use of the rectangular coordinate system, and thus, is recorded therein. The information recorded in the ROM is inputted so that the coordinate system is transformed at a real time by means of the rectangular coordinate position detecting circuit 5, and therefore, is read out as it is unchanged, and then, is successively recorded on the disk as a data such as a change of recording laser power and a division of a long pit.

In the voltage converter circuit 15 shown in FIG. 17, the second information SE is supplied as an address signal of the read only memory (ROM) 170. The ROM 170 previously calculates what value should be taken, in response to the second information SE having a value of 0 or 1 indicative of the recording laser power, and then, records the value. To give an example, the following is a description on the case where the laser power is changed from 100% to 85% as described in the first half of this third embodiment. For example, in the case where a value of the second information SE is 0, a numerical value 100 is recorded in response to an address 0 because a 100% laser power is expected. Further, in the case where the value of the second information SE is 1, a numerical value 85 is recorded in response to an address 7 because a 85% laser power is expected. Further, in the case where the staircase signal SF has the values from 1 to 6, a value calculated from a proportional distribution between 100 and 85 is recorded.

Of course, the aforesaid example is the case on the assumption that a 100% laser power is outputted when the output of the ROM 170 is 100. In fact, taking a conversion gain of a D/A converter 171 and a conversion efficiency of the optical modulator 10A into consideration, there is a need of determining the value to be recorded in the ROM 170. Moreover, there is the case where there is no linear relationship between the laser output power and an input voltage to the optical modulator 10A; in such a case, a properly changed value need to be recorded in the ROM 170.

In the manner as described above, the laser output value read from the ROM 170 is converted into an analog voltage value SX by means of the D/A converter 171, and then, is supplied to the optical modulator 10A, and thus, the output power of the laser beam L2 is controlled.

In the above embodiment, the laser power is variable in two states. In order to slowly carry out a change of the laser power, the change of laser power may be divided into about 8 stages, and then, the laser power may be successively changed over. Moreover, in order that a proper correction is always made by means of the timing correcting circuit 192 in response to the changing laser power, an information on the laser power may be inputted as an upper address of the correction value table 71 so that the internal correction value data of the timing correcting circuit 192 is variable in response to a laser power. With the above construction, the change of laser power is made larger as compared with the conventional case; as a result, it is possible to record information such as characters and figures, which is capable of being more clearly and visibly observed, on the disk surface.

The optical information recording apparatus of this third embodiment comprises: a first modulation signal generating means (modulator circuit 4) for generating a first modulation signal SB by changing over a signal level at a period of integer multiples of a predetermined basic period T in accordance with the first information SA; a position detecting means (rectangular coordinate position detecting circuit 5) for detecting a relatively positional information on an optical information recording medium (disk master 2) of a pickup; a second information generating means (character signal generating circuit 6) for generating a second information SE in accordance with the relatively positional information; a second modulating means (second modulator circuit 180) for modifying a part of the modulation signal SB according to the second information SE; and an optical modulating means (optical modulator 10B) for modulating a laser beam L2 according to an output SD of the second modulating means. Accordingly, in the optical information recording apparatus of this third embodiment, it is possible to a visibly recognizable second information SE which is not determined in the CD and DVD standards, in a area where an information (first information SA) such as a music and video determined in the CD and DVD standards.

Moreover, in this third embodiment, the second modulating means (second modulator circuit 180) comprises: a signal overlapping means (signal overlapping circuit 191) for overlapping the modulation signal SB with and the second information SE so as to generate an overlapping signal SC; and a timing correcting means (timing correcting circuit 192) for correcting a timing of the overlapping signal SC so as to generate a second modulation signal SD. The signal overlapping means 191 comprises: a pattern detecting means (latch circuits 200A to 200M, AND gates 201 to 203, OR gate 204) for detecting a pattern of the modulation signal SB; and a pulse dividing means (NAND gate 205, AND gate 206, latch circuit 207) for dividing a pulse having a predetermined time width (length) or more into two or more pulses according to an output MD of the pattern detecting means and the second information. Thus, it is possible to record a second information having a high contrast as compared with the conventional case. Further, it is possible to obtain an optical disk which has a more preferable signal characteristic as compared with the conventional case.

The optical information recording method of this third embodiment comprises the following steps of: generating the first modulation signal SB which is variable at a period of integer multiples of a predetermined period T from the first information SA; detecting a relative position of laser beam on an optical information recording medium (disk master 2); generating a second information SE according to the relative position; detecting a portion of the first modulation signal SB having no change for a predetermined time; generating a second modulation signal SD which is prepared by modifying a portion of the first modulation signal SB having no change according to the second information SE; and modulating a laser beam L2 according to the second modulation signal SD. Accordingly, in the optical information recording method of this third embodiment, for example, in addition to an information (first information SA) such as a music and a video determined based on the CD or DVD standards, it is possible to record a visible second information SE which is not determined in the CD or DVD standards in the identical disk area.

Moreover, the modification of the portion having no change is carried out in the following manner; more specifically, a recording pulse having a predetermined length or more is divided into two pulses and one space. Thus, it is possible to record a clear second information.

In the optical information recording medium of this third embodiment, the first information SA is recorded by mainly changing a pit length and position, and the second information is recorded in a manner that, in pits, a pit having a predetermined length or more is divided into two parts, or is formed so as to have a depressed or bulged portion. Thus, the second information SE forms a two-dimensional pattern on the optical information recording medium (disk master 2). Accordingly, in the optical information recording method of this third embodiment, for example, in addition to an information (first information SA) such as a music and a video determined based on the CD or DVD standards, it is possible to obtain a medium recording a second information SE which is not determined in the CD or DVD standards. Further, it is possible to record a visibly recognizable graphic information such as characters and figures in a disk signal area as the second information, and thus, to obtain a value added disk. Further, the graphic information of the optical information recording medium of this third embodiment can be more clearly confirmed as compared with the conventional case.

Description of Fourth Embodiment

A fourth embodiment of the present invention will be described below with reference to the accompanying drawings.

Figure 24:
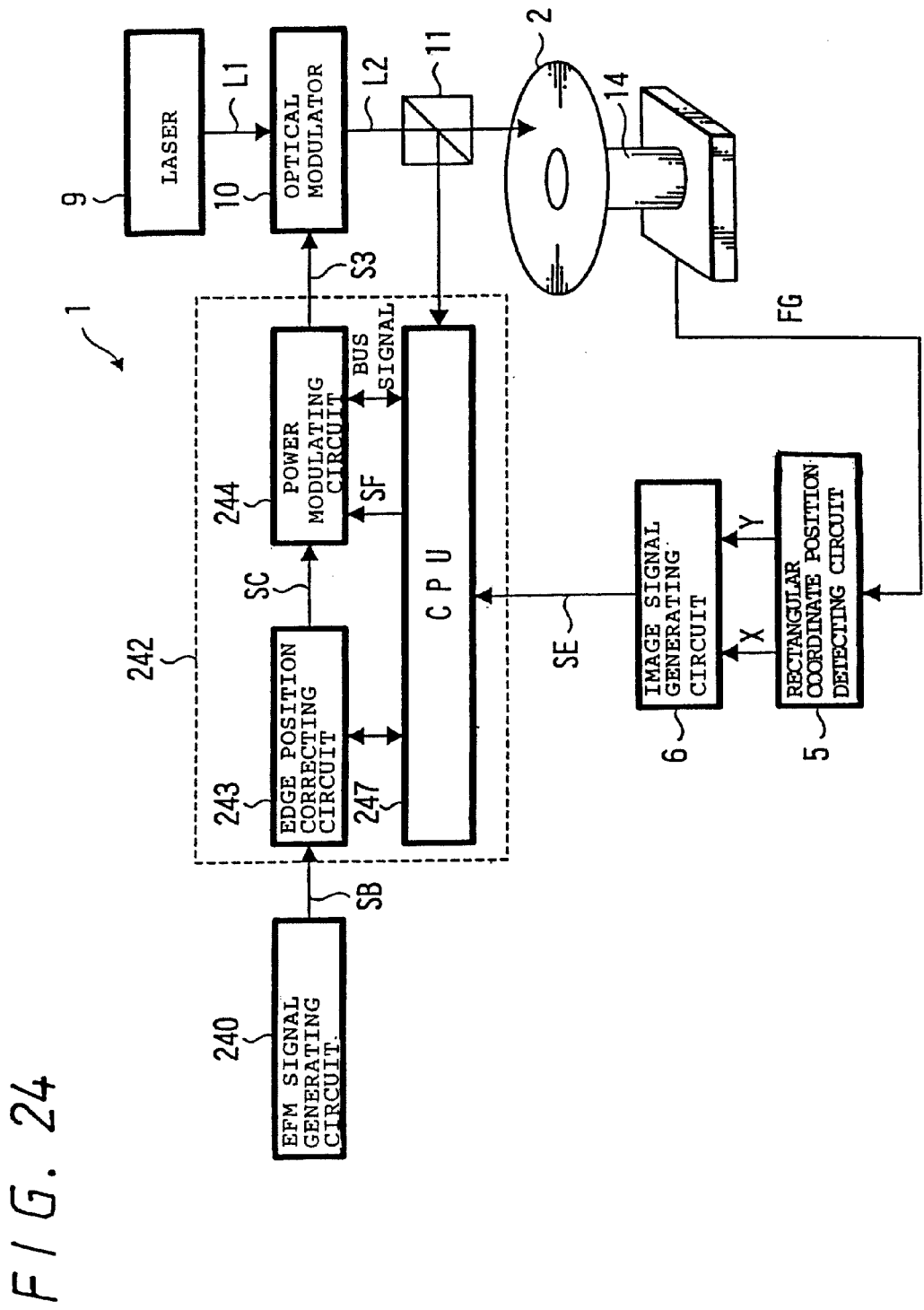
FIG. 24 is a block diagram showing a construction of an optical disk apparatus according to a fourth embodiment of the present invention.

FIG. 24 is a block diagram showing a construction of an optical disk apparatus according to the fourth embodiment. In FIG. 24, like reference numerals are used to designate the parts corresponding to those shown in FIG. 1, and the details are omitted.

This optical disk apparatus process the EFM signal SB, and then, outputs a control signal S3 to a mastering machine so as to simultaneously record the EFM signal SB and a second information SE such as a watermark (patter), an image information or the like. The EFM signal SB is an information to be stored in a disk, for example, a music, a computer data or the like. On the other hand, the second information SE is an image information or the like. An output signal is on/off-modulated in order to transmit an information to be stored in the disk, and then, an amplitude of the output signal is modulated according to the second information SE. A synchronizing signal FG from the spindle motor is inputted to the rectangular coordinate position detecting circuit 5 so that rectangular coordinates X and Y are generated. The image signal generating circuit 6 generates the second information SE on the basis of the rectangular coordinates X and Y.

Figure 28:
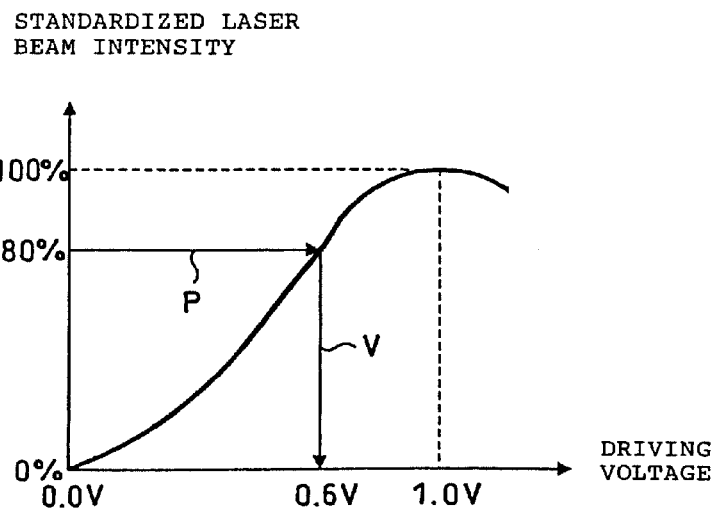
FIG. 28 is a view showing a relationship between a driving voltage and a measured laser beam intensity in this fourth embodiment.

A CPU 247 controls the whole of this optical disk apparatus. The CPU 247 measures an input-output characteristic of the optical modulator 10 prior to information recording. More specifically, the CPU 247 gradually displaces a voltage applied to the optical modulator 10 from a low voltage to a high voltage so as to measure an output of the optical modulator at the point of that time, and thereby, previously measures an input-output characteristic as shown in FIG. 28. In the case of measuring the input-output characteristic, a half mirror 11 reflects a part of laser beam to a photo detector in order to transmit a feedback information on a light intensity to the CPU 247.

Further, the CPU 247 makes an access to the correction value table 71 or a power level control table 263 via a memory bus.

The mastering machine is substantially composed of a laser 9, an optical modulator 10 and a spindle motor 14. The laser 9 emits a laser beam L1 having a light intensity modulated by the optical modulator 10. A modulated laser beam L2 exposes a disk master 2 which is covered (coated) with a thin film photosensitive sheet. After the exposure, the disk master 2 is developed in order to make a mold, and thus, a disk stamper is made. Then, an optical disk is manufactured with the use of the stamper by injection molding.

In order to form an image on the optical disk thus manufactured, two light intensities are used. However, a change of the light intensity must be smoothly and continuously performed. To achieve this purpose, the second information SE is converted into a staircase signal SF by an up/down counter function of the CPU 247.

An information such as an image by the second information SE is recorded by adjusting an edge of an information pit and by modulating a pit width. Thus, the EFM signal SB is processed in two steps. In the first step, a pit edge position is corrected by means of an edge position correcting circuit 243. This circuit 243 stores an input signal in the shift register 70, as shown in FIG. 7. The monostable multi-vibrator 72 detects a change edge of signal. Then, the delay circuit 74 and the data selector 73 shift a detected pulse depending upon a signal pattern after and before each edge. In this case, a rate to be shifted is stored in the correction value table 71.

Figure 25:
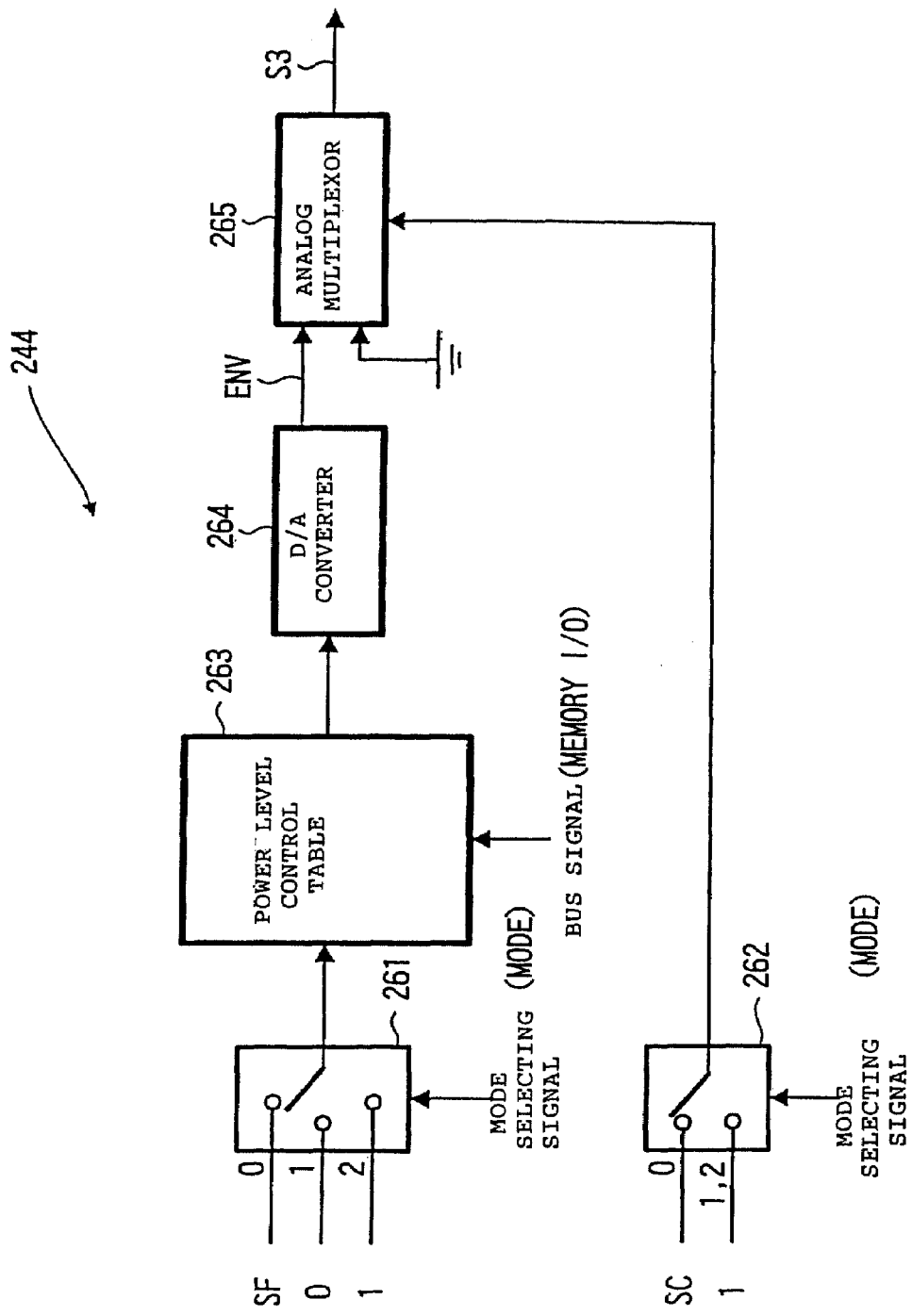
FIG. 25 is a block diagram showing a construction of a power modulator circuit of this fourth embodiment.

In the second step, in an edge correction signal SC, its amplitude is modulated by means of a power modulating circuit 244 shown in FIG. 25, and thus, the edge correction signal SC is outputted as an output modulation signal S3. The power modulating circuit 244 makes reference to the power level control table 263 depending upon the staircase signal SF, and thereby, selects a control voltage ENV suitable for an optical modulation, and thus, outputs it via a D/A converter 264. The information signal SC and the control voltage ENV are multiplexed by means of an analog multiplexor 265, and thereby, an output modulation signal S3 is generated.

Figure 26:
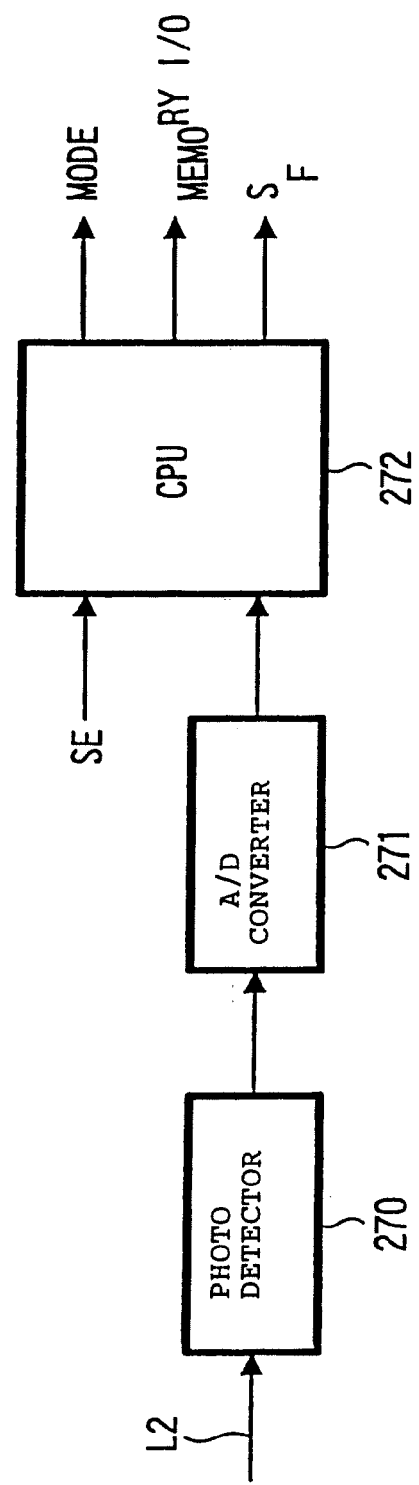
FIG. 26 is a block diagram showing a construction of a CPU of this fourth embodiment.

FIG. 26 is a block diagram showing a construction of the CPU 247. The second information instructs a change of light intensity. A photo detector 270 and an analog/digital (A/D) converter 271 are used for measuring a light intensity of laser beam for measuring the input-output characteristic of the optical modulator 10. A mode selective signal MODE of the control signal instructs a usual cutting operation and a change-over of measurement for characteristic of the optical modulator 10. A memory bus signal MOMORY I/O supplies a read and write signal of CPU 272 for making an access to each memory of the correction value table 71 and the power level control table 263.

Figures 27A, 27B:
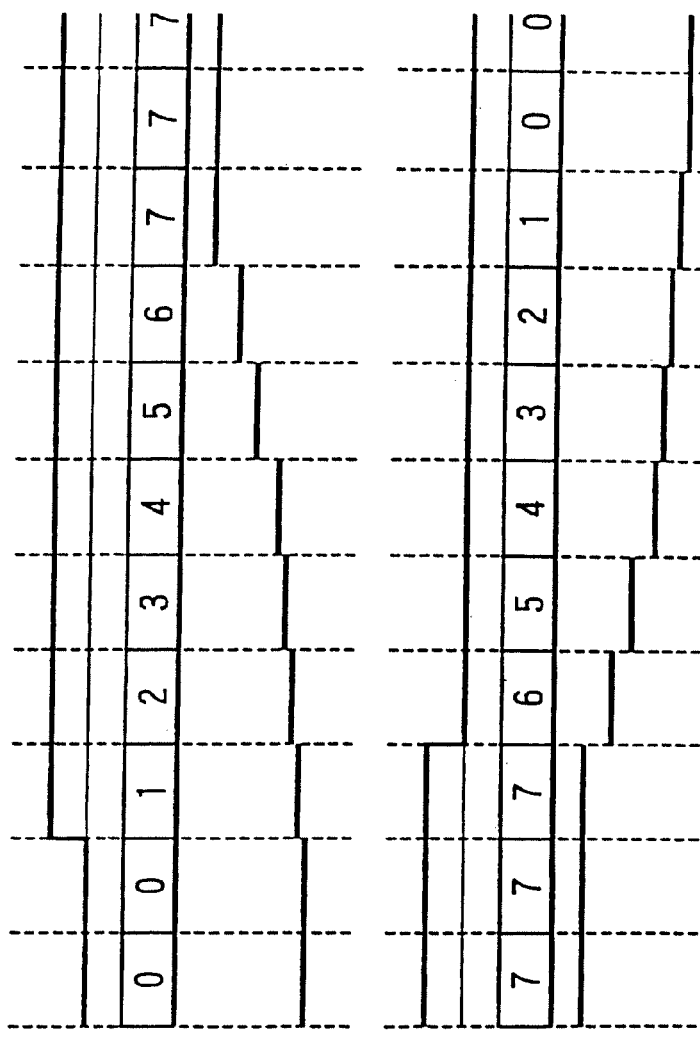
FIG. 27A shows a staircase signal SF and a control voltage signal ENV with respect to a change of second information SE from a low level to a high level.
FIG. 27B shows a staircase signal SF and a control voltage signal ENV with respect to a change of second information SE from a high level to a low level.

A timing chart of FIG. 27 shows an operation of power modulation when a power is changed from a certain power level to other power level. The staircase signal SF indicative of a recording power level slowly increases from 1 to 8 with respect to a change of the second information SE from a low level to a high level, and also, the control voltage ENV increases according to the change. On the analogy of this, in the case where the second information SE changes from a high level to a low level, the staircase signal SF and the control voltage ENV slowly decreases. A voltage of each power level is stored in the power level control table 263.

In this case, it is noticeable to determine a correction table relative to the correction value table 71 and the power level control table 263. In the correction value table 71, it is estimated that a proper shift value of a specific recording power is determined by an algorithm disclosed in Unexamined Patent Publication (Kokai) No. 10-31825. Measurement and analysis of a regenerative signal of a sample disk from a disk reproducing apparatus are made on the basis of the algorithm disclosed in Unexamined Patent Publication (Kokai) No. 10-31825, and thereby, the reproducing apparatus is driven so that a required correction shaft is carried out. Such processing is applied between a high power and a low power used for recording the second information. A shaft value of an intermediate power level is obtained from a linear interpolation.

In the sum of an N-kind power level, a pattern of the EFM signal is set as P, and the staircase signal SF takes a value i. On the above assumption, a shift value $S_i$ interpolated in an intermediate power level is expressed as the following mathematical equation 3.

Mathematical equation 3:

$$S_i(P)=S_i(P)+\{i/(N-1)\}\cdot\{S_N(P)-S_i(P)\}$$

The interpolated shift values $S_i$ (P) and $S_N$ (P) are respectively a shift value of low power recording and high power recording. As a result of the above interpolation, the above values are stored in the correction value table 71 as the uppermost address. In the power level control table 263, the same method as described above is employed. However, the optical modulator 10 has a non-linear characteristic; for this reason, even if the control voltage is simply linear-interpolated, a smooth change is not obtained.

In order to explain the above problem, a characteristic shown in FIG. 28 is recited as an example. FIG. 28 shows a measurement example of a laser beam intensity of an optical acoustic modulator with respect to a driving voltage (Regarding the principle and characteristic of a variable optical modulator, please refer to Goodman. Introduction to Fourier Optics. McGrow-Hill, 1996.) In this example, when the driving voltage is 0.5 V, an inclination of the laser beam intensity has a sudden gradient; however, when the driving voltage is 1 V, the laser beam characteristic becomes the peak. When the driving voltage is 0.5 V, the same voltage step causes a sudden change of the laser beam intensity; however, when the driving voltage is 1 V, the laser beam intensity is unchanged.

Figure 30A:
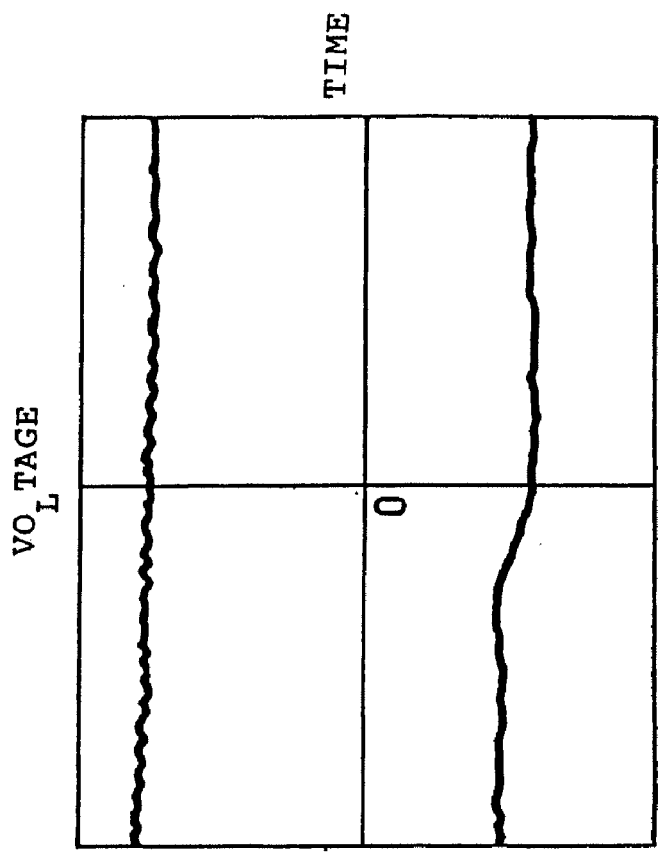
FIG. 30A shows the case where the recording method of the present invention is not employed.

In the case of carrying out a cutting operation, the voltage is variable like a step, and with the change, an edge correction is also variable. However, if the optical modulator 10 has a non-linear characteristic as shown in FIG. 28, a non-adaptation is generated between the correction of edge position and a change rate of recording power. This non-adaptation is measured (observed) as an overshoot in the vicinity of a change-over of the regenerative signal, as shown in a regenerative signal example in FIG. 30A; as a result, a jitter is worsen.

For this reason, a correction is made on the laser power. This correction comprises the following two steps. In the first step, an intermediate intensity value $P_i$ is determined by a linear interpolation between end portion powers $P_1$ and $P_N$ as shown in the following equation 4.

Mathematical equation 4:

$$P_i=P_1+\{i/(N-1)\}\cdot(P_N-P_i)$$

Next, with the use of the obtained input-output characteristic of the optical modulator 10, a driving voltage value is determined from each $P_i$. This driving voltage is obtained from the previously determined characteristic (e.g., FIG. 28) of the optical modulator by carrying out an inverse operation (calculation). More specifically, concerning a certain power value PI, a coordinate on the point of intersection of characteristic curve is determined, and then, a voltage is obtained from the coordinate. A voltage V is obtained by carrying out an invert operation of the input-output characteristic of the optical modulator, and the voltage V is set as a driving voltage V stored in the power level control table 263.

Figure 29:
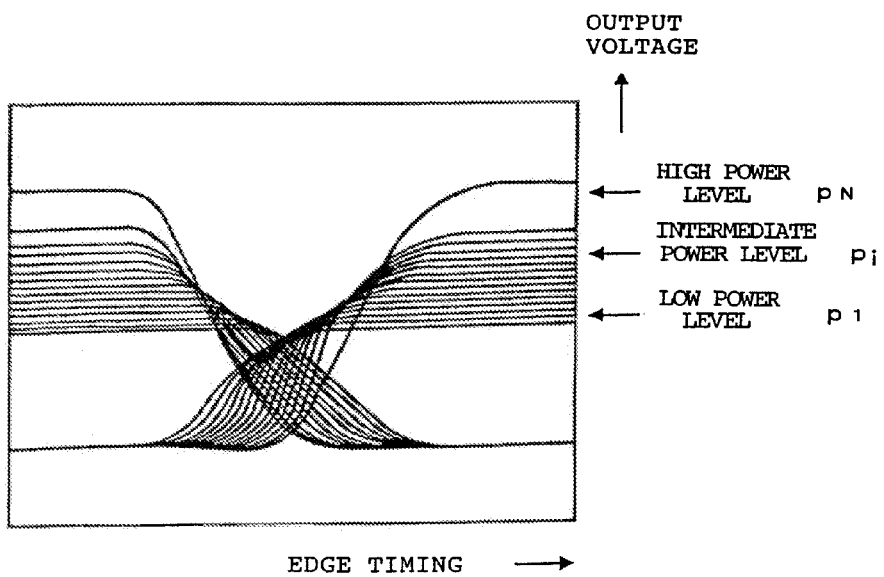
FIG. 29 is a view showing a measurement example of a standardized laser beam intensity of an optical acoustic modulator with respect to the driving voltage in this fourth embodiment.

When plotting the corrected edge timing and the driving voltage thus obtained on a graph, a "butterfly" type signal as shown in FIG. 29 is obtained. As seen from FIG. 29, in a power interpolation of this fourth embodiment, a voltage having a non-equal interval is observed on the output voltage axis.

Figure 30B:
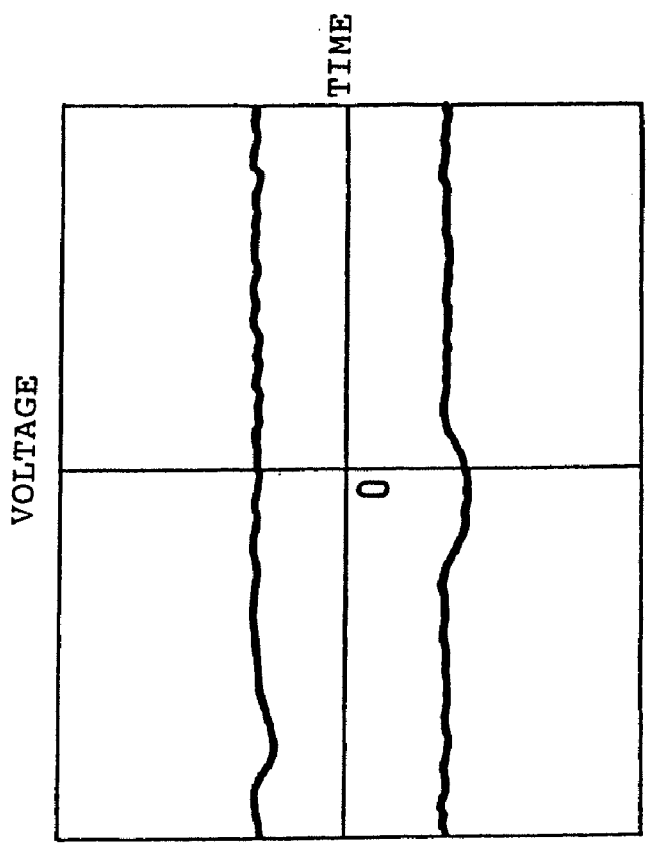
FIG. 30B shows the case where the recording method of the present invention is employed.

FIG. 30B shows an envelop signal of a regenerative signal of a sample disk recorded with the use of the correcting technology of this fourth embodiment. As is evident from FIG. 30B, the envelop signal is different from that shown in FIG. 30A, and varies so as to be smoothly amplified without an overshoot.

Thus, this fourth embodiment provides an optical information recording apparatus which records a first information signal on an optical information recording medium by carrying out an on/off modulation of a laser beam source at a period of integer multiples of a predetermined basic period in accordance with a data to be recorded, and which records a change from a predetermined light intensity level to other light intensity level, which is obtained from a micro equal interval step such that an inclination of the light intensity becomes substantially linear with respect to a second information signal and time by changing a light intensity of the laser beam source, on the optical information recording medium, comprising: measuring means for measuring a laser intensity of the modulated laser beam; control means for controlling a driving signal of the modulated laser beam; characteristic measuring means for measuring a characteristic of laser beam intensity with respect to a predetermined pair of amplitudes of the driving signal obtained by the measuring means and the control means; characteristic inverting means for carrying out an invert operation of the characteristic so as to determine a driving amplitude corresponding to a certain light intensity, and storing the result; and timing correcting means for correcting a timing of the modulated signal in accordance with a light intensity level of the laser beam, in the characteristic inverting means storing a driving amplitude for making a desired light intensity output, the light intensity of the laser beam being directly controlled during a change by investigating a necessary driving amplitude, and further, the resultant regenerative signal of the optical information recording medium being smoothly variable in a recording range where a recording light intensity changes so that the optical information recording medium can be safely reproduce. Therefore, a non-linearity of the optical modulator is corrected, and a change-over of a proper pit edge depending upon an intermediate recording level is selected, and further, a difference in light intensity between two recording levels is made larger. Whereby it is possible to record a range of smooth change between two recording levels, and to realize a desirably smooth change between two watermark patterns. Further, a difference between two light intensities is made large, and thereby, it is possible to record a more clear "watermark patter" on the optical disk.

Further, this fourth embodiment provides an optical information recording method which records a first information signal on an optical information recording medium, and which records a change from a predetermined light intensity level to other light intensity level, which is obtained from a micro equal interval step such that an inclination of the light intensity becomes substantially linear with respect to a second information signal and time by changing a light intensity of the laser beam source, on the optical information recording medium, and further includes a timing correcting step applied to the first information signal in accordance with a light intensity level, comprising the following steps of: a measuring step of measuring a laser intensity of the modulated laser beam; a control step of controlling a driving signal of the modulated laser beam; an invert operation step of measuring a characteristic of laser beam intensity with respect to a predetermined pair of amplitudes of the driving signal obtained by the measuring means and the control means, and carrying out an invert operation of the characteristic, and further, storing the invert operation value which is a driving signal corresponding to a certain light intensity; and a timing correction value determining step of determining a timing correction value relative to an intermediate light intensity level in a displacement period of linearly interpolating a timing value at a predetermined light intensity level, in the invert operation step of storing an invert operation characteristic for making a desired light intensity output, the light intensity of the laser beam being directly controlled during a change by investigating a necessary driving amplitude, and further, the resultant regenerative signal of the optical information recording medium being smoothly variable in a recording range where a recording light intensity changes so that the optical information recording medium can be safely reproduce. Therefore, a non-linearity of the optical modulator is corrected, and a change-over of a proper pit edge depending upon an intermediate recording level is selected, and further, a user can select a desirable difference in light intensity between two recording levels. Whereby it is possible to record a range of smooth change between two recording levels, and to realize a desirably smooth change between two watermark patterns.

Further, this fourth embodiment provides an optical information recording medium which can record an information signal by carrying out an on/off modulation of a laser beam source, a plurality of pits being formed so that a desired information is recorded, and a second information being recorded by selecting a pit having a pit width selected from predetermined plural widths, the selection of the pit having plural pit widths being carried out so that a light intensity of laser beam has a fixed inclination in a predetermined observing time, and in order to correct a change of a reflection light generated by a difference of pit width in a reproducing time, an edge position of the pit being adjusted in position, and thereby, a watermark patter or visible image of the second information being included in the optical information recording medium while the information signal being reproduced. Therefore, a non-linearity of the optical modulator is corrected, and a change-over of a proper pit edge depending upon an intermediate recording level is selected, and further, a user can select a desirable difference in light intensity between two recording levels. Whereby it is possible to obtain an optical information recording medium which can record a range of smooth change between two recording levels, and can realize a desirably smooth change between two watermark patterns.

[Generation of Correction Value Table]

Figure 31:
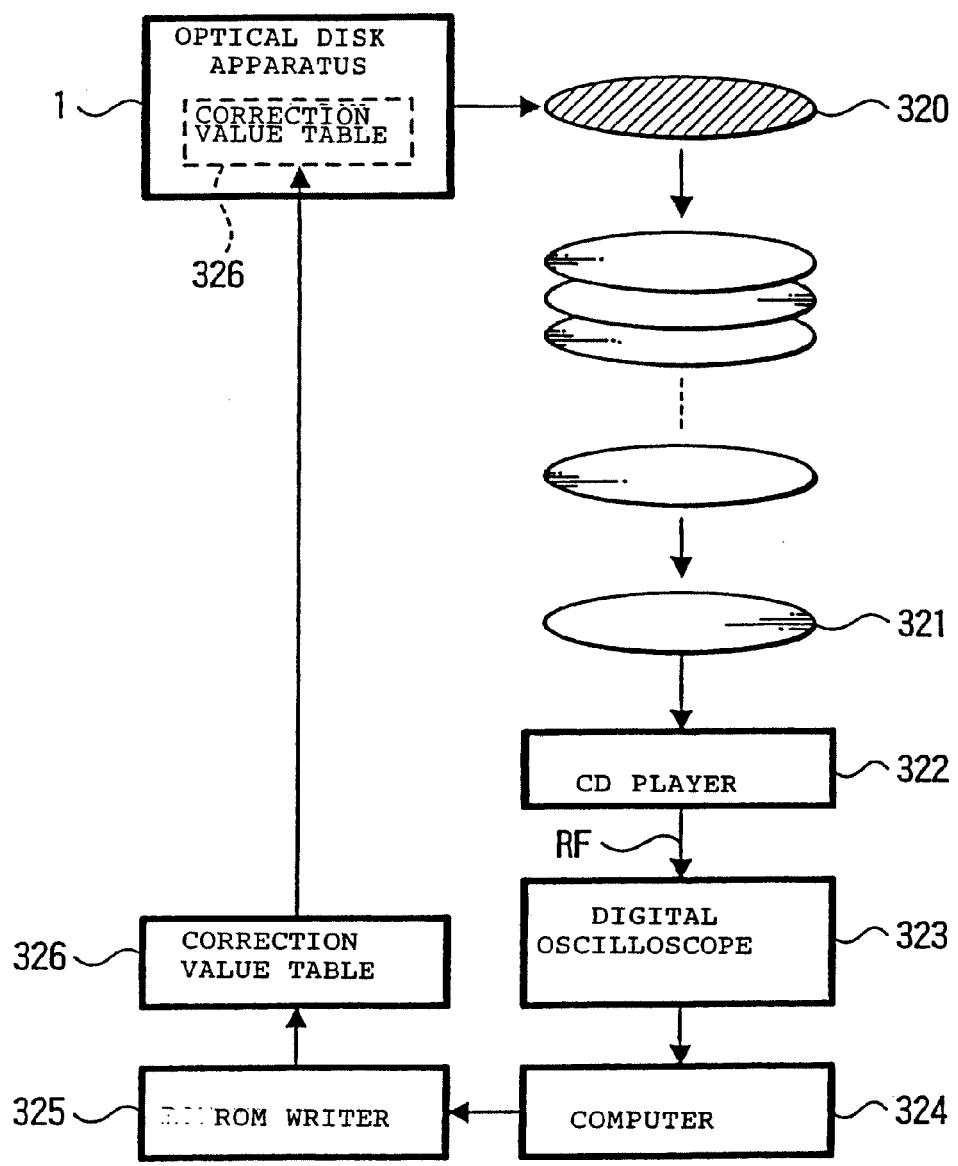
FIG. 31 is a view showing a process for preparing a correction value table of this fourth embodiment.

FIG. 31 is a view to explain a process for generating the correction value table 71 used for an edge timing correction in each optical disk apparatus described in the above first to fourth embodiments. The following is a description on a correction value table in the first embodiment; likewise, the correction value table is applicable to other embodiments.

The correction value table 71 is included in both the rise edge correcting circuit 60A and the fall edge correcting circuit 60B. These correction value tables are correctly and suitably set, and thereby, even in the case where a power (intensity) of laser beam L, a pit length and an interval between front and rear pits vary, or in the cease where the recording laser power varies according to the second information SE such as graphics and characters, it is possible to manufacture a disk which is constructed in a manner that a regenerative signal crosses a predetermined slice level at a correct timing synchronous with the clock CK (i.e., generating no jitter).

These correction value tables 71 are set in the rise edge correcting circuit 60A and the fall edge correcting circuit 60B, and the method for generating these tables is the same in the circuits 60A and 60B except that a generating condition is different. Therefore, only rise edge correcting circuit 60A will be described below.

In the following process, a disk master 2 for evaluation is prepared with the use of the optical disk apparatus 1, and then, a correction value table 326 is set on the basis of the reproductive result of a compact disk made from the disk master.

In the case of preparing the disk master for evaluation, the optical disk apparatus 1 shown in FIG. 1 is provided with a correction value table 326 for evaluation criterion. In the correction value table 326 for evaluation criterion, a correction value data DF is set and formed so that a center tap output of the delay circuit 74 is always selectively outputted in the selector 8 shown in FIG. 1. Moreover, an image data for evaluation criterion is stored in the image signal generating circuit 6. In this process, according to each of 100% and 85% laser outputs, the optical modulator 10B is driven by the EFM modulation signal S2, and then, the disk master 2 is exposed under the same condition as a usual process for manufacturing a compact disk.

In this process, the disk master 2 for evaluation thus exposed is developed, and thereafter, is subjected to electroforming so as to make a mother disk, and thus, a stamper is made from the mother disk. Further, a compact disk for evaluation is made from the stamper in the same manner as a process for manufacturing an ordinary compact disk.

Incidentally, according to the second embodiment, in this process, the timing correcting circuit 131 is set to a state of having no effect. By doing so, a signal SC having no effect by the timing correcting circuit 131 is transmitted to the optical modulator 10B, and then, the disk master 2 is exposed by the laser beam L2 having a 100% laser power in the same manner as manufacturing an ordinary compact disk.

In FIG. 31, a compact disk player (CD player) 322 plays back (reproduces) a compact disk for evaluation manufactured in the above manner according to an instruction from a computer 324. At this time, the CD player 322 is controlled by means of the computer 324 so as to change over an operation, and then, outputs a regenerative signal RF whose signal level is variable in accordance with a quantity of a return light obtained from the compact disk 321 from a built-in signal processing circuit to a digital oscilloscope 323. In the compact disk, a pit width varies according to a power of the laser beam L, and when observing the regenerative signal RF with the use of the digital oscilloscope, an amplitude of the regenerative signal varies in a portion corresponding to a pit.

With a change of the pit width, a front edge position and a rear edge position are variable, and thereby, a great jitter is generated with a change of amplitude, and also, an asymmetry greatly varies. Further, in a portion such as a user area forming a pit by a laser beam of a low level, a jitter is generated from front and rear pits by an interference between codes.

In this stage, a binary-coded level of the regenerative signal is always not set to a predetermined level like an ordinary compact disk. Further, a pit formation is fully carried out; for this reason, a jitter is generated.

The digital oscilloscope 323 is controlled by the computer so as to change over an operation, and carries out an analog/digital conversion of the regenerative signal RF at a sampling frequency twenty times as much as a channel clock; and thus, outputs a digital signal to the computer 324.

The computer 324 controls the operation of the CD player 322 and the digital oscilloscope 323, and processes a digital signal outputted from the digital oscilloscope 323, and thereby, successively calculates (computes) a correction value data DF.

Finally, the computer 324 drives a ROM writer 325, and then, successively stores the calculated correction value data DF in a read only memory, and thereby, forms a correction value table 326. According to the correction value table 326 thus formed, an optical disk can be finally manufactured.

Figure 32:
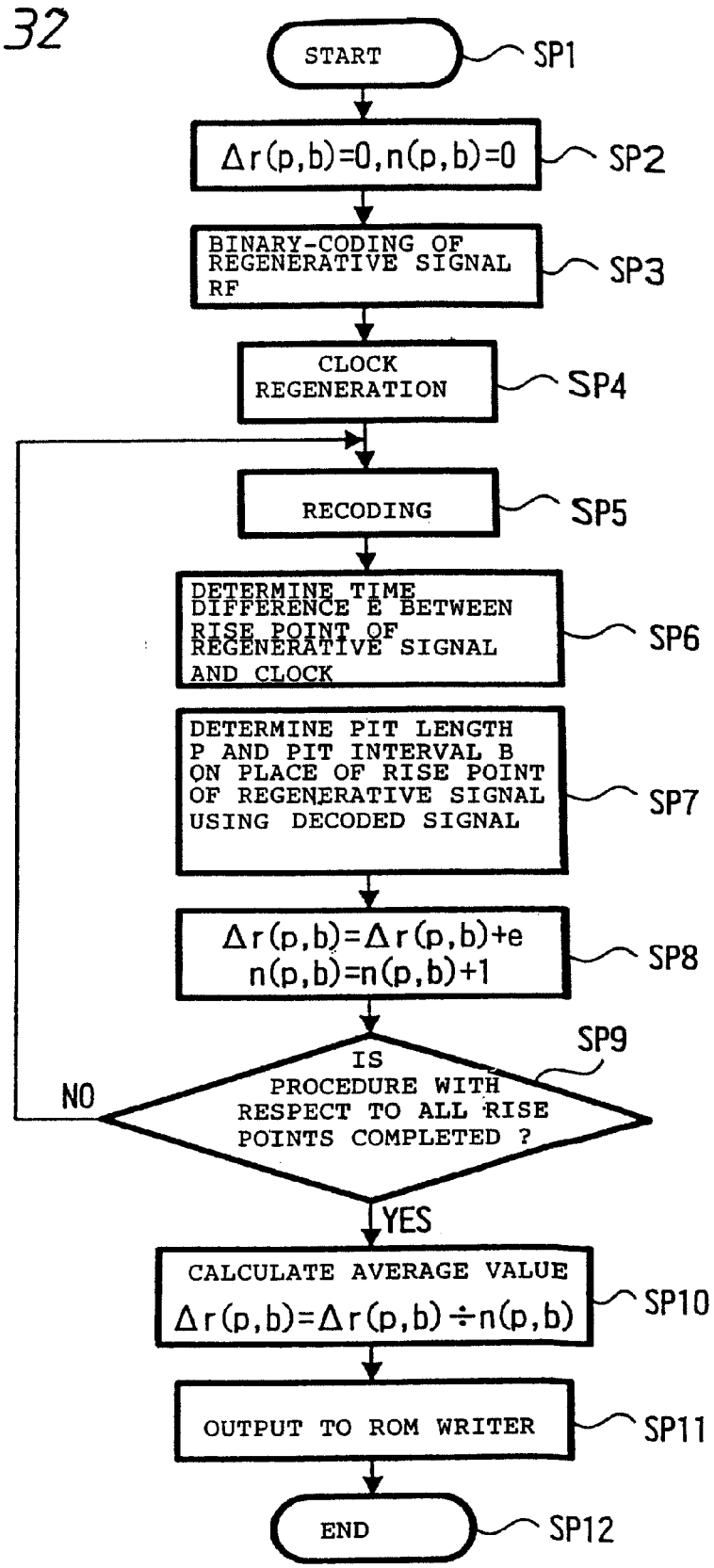
FIG. 32 is a flowchart showing a procedure of computer in this fourth embodiment.

FIG. 32 is a flowchart showing a procedure for making the correction value data DF in the computer 324. In this procedure, the computer 324 proceeds step SP1, and then, sets a jitter detection result Δr (p, b) and the number of jitter measured times n (p, b) to a value 0. In this case, the computer 324 calculates (computes) the jitter detection result Δr (p, b) on front and rear edges of a jitter detection target every combination of a pit length p and a pit interval b, and then, counts the number of jitter measured times n (p, b). For this reason, the computer 324 sets jitter detection result Δr (p, b) and the number of jitter measured times n (p, b) to the initial value.

Sequentially, the computer 324 proceeds step SP3, and then, makes a comparison between a digital signal outputted from the digital oscilloscope 323 and a predetermined slice level VL, and thereby, generates a digital binary-coded signal made by binary-coding the regenerative signal RF. Incidentally, the computer 324 binary-codes a digital signal so that the digital signal becomes a value 1 when being more than the slice level, and becomes a value 0 when being less than the slice level.

Sequentially, the computer 324 proceeds step SP4, and then, generates a regenerative clock from the binary-coded signal made by the digital signal. In this case, the computer 324 simulates an operation of the PLL circuit according to an operational processing based on the binary-coded signal, and thereby, generates a regenerative clock.

Further, in the next step SP5, the computer 324 samples the binary-coded signal at each fall edge timing of the regenerative clock thus generated, and thereby, decodes a modulation signal (hereinafter, the decoded modulation signal is referred to as a decoded signal).

Sequentially, the computer 324 proceeds step SP6, and then, detects a time difference (lag) e between the point of time of a rise edge of the binary-coded signal and the point of time of the fall of regenerative clock nearest to the rise edge, and thereby, time-measures a jitter generated in the edge. Next, in step SP7, the computer 324 detects a pit length p and a pit interval b of the front and rear pits from the decoded signal with respect to the edge time-measured in step SP6.

In step SP8, the computer 324 adds the time difference e detected in step SP6 to the jitter detection result Δr (p, b) corresponding to the pit length p and the pit interval b of the front and rear pits, and increments the corresponding number of jitter measured times n (p, b) by a value 1. Sequentially, the computer 324 proceeds step SP9, and then, makes a decision whether or not time measurement of all rise edges is completed. If the decision result of negative "NO" is obtained, the sequence returns to step SP5.

Thus, the computer 324 repeats the procedure of steps SP5-SP6-SP7-SP8-SP9-SP5, and accumulates the time-measured jitter detection result for each change pattern generated in the regenerative signal RF, and then, counts the added numbers. The change pattern is classified into 6 sampling periods (period of 12T in total) based on a basic period T of the jitter detection target edge so as to correspond to the number of latch circuits 70A to 70M in the rise edge correcting circuit 60A.

When the jitter time measurement is completed with respect to all edge, the computer 324 proceeds step SP10 if the positive result is obtained in step SP9, and then, makes average the time-measured jitter detection result for each change pattern generated in the regenerative signal RF. More specifically, the jitter detected in step SP6 receives an influence by a noise; for this reason, the computer 324 makes average the jitter detection result so as to improve a measurement accuracy of jitter.

When the jitter detection result is made average in the above manner, the computer 324 sequentially proceeds step SP11, and then, generates a correction value data DF for each change pattern from the detection result, and thus, outputs each correction value data DF to a ROM write 325. In this case, assuming that a delay time difference between taps in the delay circuit 74 is set as τ, the correction value data DF is calculated from the following mathematical equation 5.

Mathematical equation 5:
$$Hr1(p, b) = Hr0(p, b) - (a/\tau) \cdot \Delta r(P, b)$$

In the above equation 5, Hr1 (p, b) is a tap of the delay circuit 74 selected from the correction value data DF, and the value 0 is a center tap of the delay circuit 74. Moreover, Hr0 (p, b) is a tap of the delay circuit 74 selected from the correction value data DF of the initial value, and in this embodiment, Hr0 (p, b) is set to 0. In the above equation 5, "a" is a constant. In this embodiment, the constant "a" is set to 1 or less (e.g., 0.7, etc.), and thereby, the correction value data can be securely converged even if there is an influence by a noise.

The computer 324 carries out a procedure for generating the aforesaid correction value data in accordance with each of the cases where the laser beam L is a 100% power and a 85% power, on the basis of a signal level of the regenerative signal RF detected via the digital oscilloscope 323. Even in the case where the power of the laser beam L falls, the computer 324 binary-codes the regenerative signal RF according to a general slice level, and then, generates a correction value data DF so that the binary-coded signal is generated at a correct timing.

In the second embodiment and others, the computer 324 carries out the aforesaid operation for each of 8 areas (regions) into which an information recording surface of the compact disk 321 is coaxially divided, and thereby, generates a different correction value data for each area. In this case, each of 8 areas is correspondent to one of 8-stage laser output.

The computer 324 stores the correction value data DF thus generated in a predetermined address area of the ROM writer 325, and thereafter, proceeds step SP12, and thus, the procedure ends. Sequentially, the computer 324 carries out the same procedure with respect to a different recording power. Then, the computer 324 carries out the above procedure with respect to all powers (8-kind power corresponding to the staircase signals SF 0 to 7), and thereafter, writing is performed by the ROM writer 325, and thus, an internal correction value table 326 (shown by a reference numeral 71 in FIG. 7) of the rise edge correcting circuit 60A is completed.

Further, the computer 324 carries out the same procedure with respect to the fall edge of the digital binary-coded signal, and thus, an internal correction value table 326 of the fall edge correcting circuit 60B is completed.

With the above construction, in the optical disk apparatus of the first embodiment shown in FIG. 1, each correction value table of the edge position correcting circuits 7A and 7B is set to the initial value, the disk master 2 for evaluation is prepared under the same condition as the condition of manufacturing the conventional compact disk 321, and then, a compact disk 321 for evaluation is made from the disk master 2.

In the compact disk 321, the laser beam L is on/off-controlled according to the modulation signal S2 having a signal level variable at a period of integer multiples of a basic period T, and then, the disk master 2 is successively exposed, and thereby, an evaluation data is recorded in accordance with a pit length and a pit interval. A power of the laser beam L falls on the basis of the image data for evaluation criterion, and thereby, a pit area having a narrow width is locally formed, and with a change of the pit width, the pit length is also variable.

Thus, in the regenerative signal obtained from the compact disk 321 for evaluation, a jitter is generated by an interference between codes of adjacent pits in a portion where a pit is formed by a fixed laser power. In a portion where the pit width varies, in addition to the interference between codes of adjacent pits, a great jitter is generated by a change of the pit width. Further, in the portion where the pit width varies, an amplitude of the regenerative signal greatly varies, and also, an asymmetry suddenly varies.

Therefore, in the regenerative signal obtained from the compact disk 321, a timing when a slice level crosses varies in accordance with a change pattern of the modulation signal S2 corresponding to a length and interval of front and rear pits, an exposure position in a radius direction, and a laser beam power in exposure, and a great jitter is generated in the regenerative clock generated from the regenerative signal.

The compact disk 321 is reproduced (played back) by means of the compact disk player 322, and the regenerative signal RF is converted into a digital signal by means of the digital oscilloscope 323, and thereafter, a binary-coded signal, an EFM modulation signal and a regenerative clock are generated by means of the computer 324. Further, in the compact disk 321, pit length and interval of front and rear pits are detected by the binary-coded signal for each edge of the binary-coded signal, and then, a jitter of each edge of the binary-coded signal is time-measured for each change pattern.

Moreover, the time measurement result is made average for each change pattern, and then, a jitter generated in each power of the laser beam L is detected together with a jitter generated by an interference between codes. In the compact disk 321, according to the jitter thus detected, the above mathematical equation 5 is calculated on the basis of a delay time difference τ between taps of the delay circuit 74 for each of 8 areas into which the information recording surface is coaxially divided, and then, on the basis of a center tap of the delay circuit 74, a tap position of the delay circuit 74, which can offset the detected jitter, is detected. A data for specifying the detected tap position is stored in the read only memory as a correction value data, and thereby, the delay time difference τ between taps of the delay circuit 74 is set as a unit for correcting a jitter, and thus, a correction value table 326 is generated.

Therefore, in order that an interference between codes of adjacent pits, the audio data SA is recorded in the compact disk 321 according to a pit length and a pit interval correcting the front edge position and the rear edge position, in accordance with a combination pattern of the adjacent pits. Further, a pit having a narrow width is locally formed in accordance with the image data, and then, the front edge position and the rear edge position are corrected so as to offset a change of pit length generated by the change of pit width.

In this serial procedure, in the compact disk 321 of this embodiment, even if the pit width is varied so as to visibly confirm characters by the image data and image, the front edge position and the rear edge position are corrected so as to offset a change of pit length generated by the change of pit width, and thereby, the regenerative signal RF is binary-coded according to a fixed slice level, and thus, it is possible to generate a binary-coded signal at a correct timing. In other words, it is possible to generate a binary-coded signal so as to effectively avoid a jitter generated in the regenerative clock CK accompanying with a change of the power of laser beam L. Further, a jitter position is corrected so as to reduce an interference between codes, and thereby, it is possible to reduce a jitter generated by the interference between codes. Thus, the pit width is varied; nevertheless, it is possible to correctly reproduce an audio data.

With the above construction, the positional information on exposure position by the polar coordinate is converted into the positional information by the rectangular coordinate so as to access the image data, and then, in accordance with the image data, the pit width is varied, and thereby, it is possible to readily and visibly record characters and images by the image data in the information recording surface of the compact disk 321 by a simple work of merely storing the image data of bit map format in the image memory.

In this case, in order to correct a change of pit length with the change of the pit width, and to reduce an interference between codes by adjacent pits, a timing of irradiating a laser beam is corrected, and thereby, it is possible to securely reproduce the audio data even in the case where a desired data is recorded with a high density.

The aforesaid embodiment has described the case where characters and images are visibly recorded by changing the pit width of the pit allotted to the audio data; however, the present invention is not limited to this embodiment. For example, the image or the like may be recorded in a read-in area by changing the pit width of the pit allotting a TOC data.

Further, the aforesaid embodiment has described the case where the compact disk 321 is manufactured by directly using the correction value table 326 prepared based on the compact disk 321 for evaluation; however, the present invention is not limited to this embodiment. A compact disk for evaluation is newly manufactured with the use of the correction value table 326 prepared based on the compact disk 321 for evaluation, and then, the correction value table may be modified based on the newly manufactured compact disk for evaluation. In this manner, the correction value table is repeatedly modified, and thereby, it is possible to securely a jitter.

Further, the aforesaid embodiment has described the case where the modulation signal is sampled into 13, and then, a change patter is detected; however, the present invention is not limited to this embodiment. As the necessity arises, the number of sampling may be increased, and thereby, it is possible to make an application to a long recording information pattern.

Further, the aforesaid embodiment has described the case where the binary-coded signal based on a reference clock is time-measured, and thereby, a jitter is measured, and then, the correction value data is generated from the measurement result; however, the present invention is not limited to this embodiment. In the case where an accuracy is sufficiently secured in practice, in place of measuring the jitter by time measurement, the correction value data may be generated by detecting a signal level of the regenerative signal based on the reference clock. In this case, an error voltage between the detected signal level of the regenerative signal and a slice level is calculated, and then, the correction value table is calculated on the basis of the error voltage and a transient response characteristic of the regenerative signal.

Further, the aforesaid embodiment has described the case where a timing of the modulation signal is corrected according to a correction data made into a table; however, the present invention is not limited to this embodiment. In the case where an accuracy is sufficiently secured in practice, in place of the previously detected correction value data, the correction value data is calculated by an operation, and thereby, the timing of the modulation signal may be corrected.

Further, the aforesaid embodiment has described the case where a coordinate transformation is carried out by an operation of the coordinate transforming circuit 22 (central processing unit); however, the present invention is not limited to this embodiment. The coordinate transformation may be carried out by a table of the read only memory (ROM).

Further, the aforesaid embodiment has described the case where the FG signal is counted so as to generate a positional information by the polar coordinate; however, the present invention is not limited to this embodiment. The positional information by the polar coordinate may be generated by various reference signals synchronous with a rotation of the spindle motor, and further, a positional information may be detected by directly detecting a position.

Further, the aforesaid embodiment has described the case where the disk master is rotatably driven under the condition of a constant linear velocity; however, the present invention is not limited to this embodiment. The disk master may be rotatably driven under the condition of a constant angular velocity.

Further, the aforesaid embodiment has described the case where this embodiment is applied to a compact disk; however, the present invention is not limited to this. The present invention is widely applicable to an optical disk apparatus which records various data by a pit. In addition, the present invention is widely applicable to an optical disk apparatus which records various data by using an apparatus having a transient response characteristic of a regenerative signal.

Moreover, in the optical disk apparatus of the second embodiment, with the use of the correction value table 326 thus prepared, an optical disk is manufactured by the optical disk apparatus 1. In the optical disk thus manufactured, even in the case where the recording power is stepwise varied according to the second information SE, a pit having an ideal length is formed according to a power change, and the optical disk is reproduced by a extremely small jitter over the entire surface of the disk. Further, in the optical disk apparatus of the third embodiment, with the use of the correction value table 326 thus prepared, an optical disk is manufactured by the optical disk apparatus 1. In the optical disk thus manufactured, even in the case where the recording power is varied to two stages according to the second information SE, a pit having an ideal length is formed according to a power change, and the optical disk is reproduced by a extremely small jitter over the entire surface of the disk.

INDUSTRIAL APPLICABILITY

The present invention is applicable to a recording apparatus for a compact disk (CD) and a digital video disk (DVD), and a recording method thereof and a recording medium. According to the present invention, the positional information on laser beam irradiation position by the polar coordinate is converted into a positional information by the rectangular coordinate so as to access the corresponding image data, and then, in accordance with the image data, a laser beam power is controlled, and thereby, it is possible to visibly and readily record characters and images on an information recording surface of a CD or the like.

Further, according to the present invention, it is possible to record an information such as a music and a video signal on an optical disk by turning on and off a recording laser according to a method which is determined in the standards of CD and DVD. Simultaneously, an output of the recording laser is gently varied, and a light emitting pulse of the recording laser is divided into two parts, or is formed into a shape of depression or bulge, thereby, it is possible to record a second information such as a watermark pattern or a visible image, which is not determined in the standards of CD and DVD and is recognizable by seeing a disk, on the identical disk.

What is claimed is:

1. An optical information recording apparatus which records a first information signal on an optical information recording medium by carrying out an on/off modulation of a laser beam source at a period of integer multiples of a predetermined basic period in accordance with a data to be recorded, and which records a change from a predetermined light intensity level to other light intensity level, which is obtained from a micro equal interval step such that an inclination of the light intensity becomes substantially linear with respect to a second information signal and time by changing a light intensity of the laser beam source, on the optical information recording medium, comprising:

measuring means for measuring a laser intensity of the modulated laser beam;

control means for controlling a driving signal of the modulated laser beam;

characteristic measuring means for measuring a characteristic of laser beam intensity with respect to a predetermined pair of amplitudes of the driving signal obtained by the measuring means and the control means;

characteristic inverting means for carrying out an invert operation of the characteristic so as to determine a driving amplitude corresponding to a certain light intensity, and storing the result; and timing correcting means for correcting a timing of the modulated signal in accordance with a light intensity level of the laser beam, wherein in the characteristic inverting means storing a driving amplitude for making a desired light intensity output, the light intensity of the laser beam is directly controlled during a change by investigating a necessary driving amplitude, and the resultant regenerative signal of the optical information recording medium being smoothly variable in a recording range where a recording light intensity changes so that the optical information recording medium can be safely reproduced.

2. The optical information recording method which records a first information signal on an optical information recording medium, and which records a change from a predetermined light intensity level to other light intensity level, which is obtained from a micro equal interval step such that an inclination of the light intensity becomes substantially linear with respect to a second information signal and time by changing a light intensity of the laser beam source, on the optical information recording medium, and further includes a timing correcting step applied to the first information signal in accordance with a light intensity level, comprising the following steps of:

a measuring step of measuring a laser intensity of the modulated laser beam;

a control step of controlling a driving signal of the modulated laser beam;

an invert operation step of measuring a characteristic of laser beam intensity with respect to a predetermined pair of amplitudes of the driving signal obtained by the measuring means and the control means, and carrying out an invert operation of the characteristic, and further, storing the invert operation value which is a driving signal corresponding to a certain light intensity; and a timing correction value determining step of determining a timing correction value relative to an intermediate light intensity level in a displacement period of linearly interpolating a timing value at a predetermined light intensity level, wherein in the invert operation step of storing an invert operation characteristic for making a desired light intensity output, the light intensity of the laser beam is directly controlled during a change by investigating a necessary driving amplitude, and the resultant regenerative signal of the optical information recording medium is smoothly variable in a recording range where a recording light intensity changes so that the optical information recording medium can be safely reproduced.

3. An optical information recording medium which can record an information signal by carrying out an on/off modulation of a laser beam source, a plurality of pits being formed so that a desired information is recorded, and a second information being recorded by selecting a pit having a pit width selected from predetermined plural widths, the selection of the pit having plural pit widths being carried out so that a light intensity of laser beam has a fixed inclination in a predetermined observing time, and in order to correct a change of a reflection light generated by a difference of pit width in a reproducing time, an edge position of the pit being adjusted in position, and thereby, a watermark pattern or visible image of the second information being included in the optical information recording medium while the information signal being reproduced.

* * * * *